(12) United States Patent
Ebrecht et al.

(10) Patent No.: US 9,738,005 B2
(45) Date of Patent: Aug. 22, 2017

(54) ANVIL ROLL AND INTERNAL ADJUSTMENT MECHANISMS THEREFOR

(71) Applicant: Roto-Die Company, Inc., St. Louis, MO (US)

(72) Inventors: Scott R. Ebrecht, Eureka, MO (US); George R. Gates, Ballwin, MO (US)

(73) Assignee: ROTO-DIE COMPANY, INC., St. Louis, MO (US)

( * ) Notice: Subject to any disclaimer, the term of this patent is extended or adjusted under 35 U.S.C. 154(b) by 0 days.

(21) Appl. No.: 14/928,434

(22) Filed: Oct. 30, 2015

(65) Prior Publication Data
US 2016/0121506 A1 May 5, 2016

Related U.S. Application Data

(60) Provisional application No. 62/073,226, filed on Oct. 31, 2014.

(51) Int. Cl.
*B26D 7/26* (2006.01)
*B26D 1/22* (2006.01)
(Continued)

(52) U.S. Cl.
CPC .............. *B26D 7/2628* (2013.01); *B26D 1/22* (2013.01); *B26D 7/204* (2013.01); *B26D 7/265* (2013.01); *F16H 1/16* (2013.01); *F16H 1/28* (2013.01); *Y10T 83/7751* (2015.04); *Y10T 83/9309* (2015.04)

(58) Field of Classification Search
CPC ............... Y10T 83/788; Y10T 83/8745; Y10T 83/9309; Y10T 83/9312; Y10T 83/9457; Y10T 83/9464; Y10T 83/9466; Y10T 83/9469; Y10T 83/9406; Y10T 83/4833; Y10T 83/4838; Y10T 83/7751; Y10T 83/7859; B26D 7/2628; B26D 7/204; B26D 7/265; B26D 1/22; B26D 1/48;
(Continued)

(56) References Cited

U.S. PATENT DOCUMENTS 4,226,150 A   10/1980  Reed
4,759,247 A    7/1988  Bell et al.
(Continued)

OTHER PUBLICATIONS

International Search Report and Written Opinion for PCT/US2015/058329 dated Feb. 16, 2016.

*Primary Examiner* — Phong Nguyen
(74) *Attorney, Agent, or Firm* — Thompson Coburn LLP

(57) ABSTRACT

An adjustment mechanism for an anvil roll has a body with first and second ends and a hollow interior. A bore extends from the first end into the hollow interior. The body is mountable to an axial end of the anvil roll at the first end. The hollow interior has first and second adjustment drives. The first adjustment drive extends from the second end of the body into the hollow interior and comprises a gear train with drive gears extending between a first adjustment operator and a first shaft extending from the body hollow interior through the bore of the body to the first end of the body. The second adjustment drive comprises a gear train with drive gears extending between a second adjustment operator and a second shaft extending from the hollow interior through the bore of the body to the first end of the body.

21 Claims, 29 Drawing Sheets

(51) Int. Cl.
*F16H 1/28* (2006.01)
*F16H 1/16* (2006.01)
*B26D 7/20* (2006.01)

(58) Field of Classification Search
CPC ... F16H 3/72; F16H 3/66; F16H 3/666; F16H 1/16; F16H 1/28
See application file for complete search history.

(56) References Cited

U.S. PATENT DOCUMENTS

| | | | |
|---|---|---|---|
| 5,083,488 A | 1/1992 | Stanley et al. | |
| 5,087,237 A * | 2/1992 | Nunley | B26D 7/1836 493/342 |
| 2004/0035305 A1 * | 2/2004 | Strasser | B26D 7/265 101/6 |
| 2006/0065088 A1 * | 3/2006 | Grenier | B26D 7/1863 83/98 |
| 2012/0055305 A1 | 3/2012 | Betti | |
| 2012/0264562 A1 * | 10/2012 | Park | F16K 31/56 475/331 |

\* cited by examiner

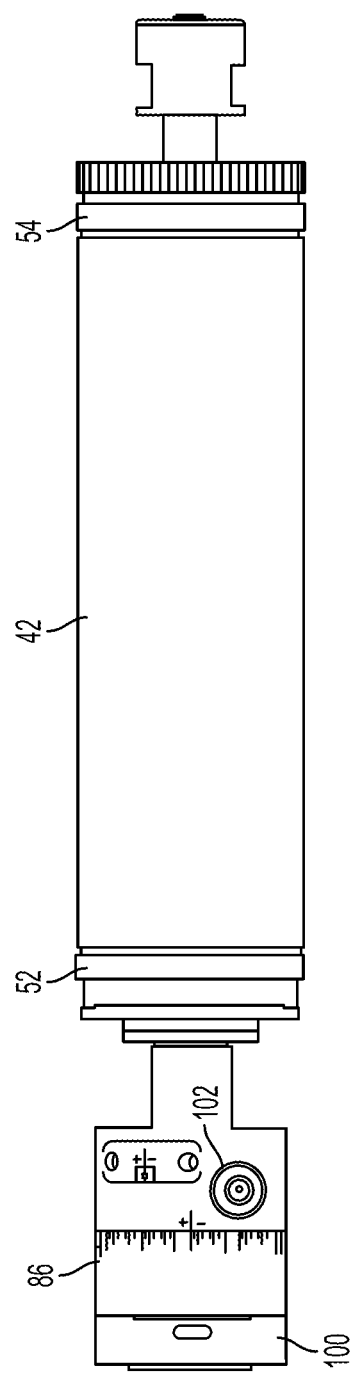
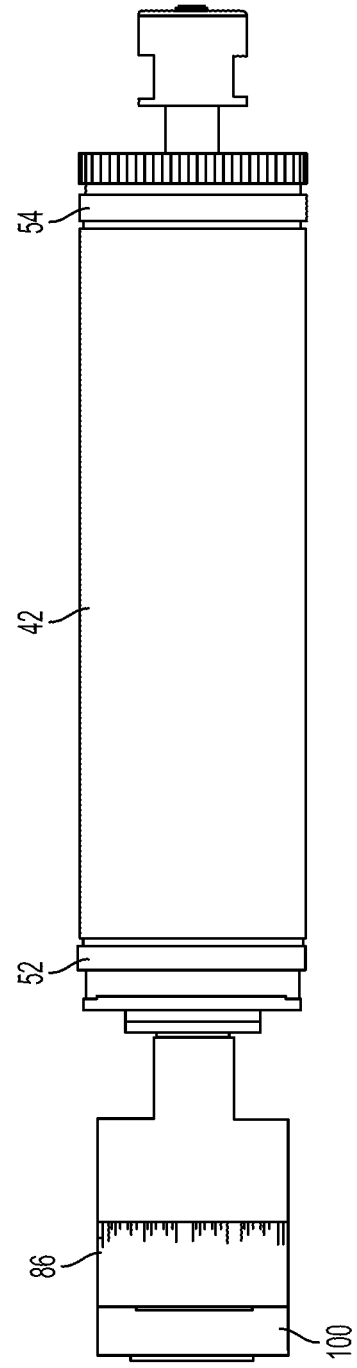

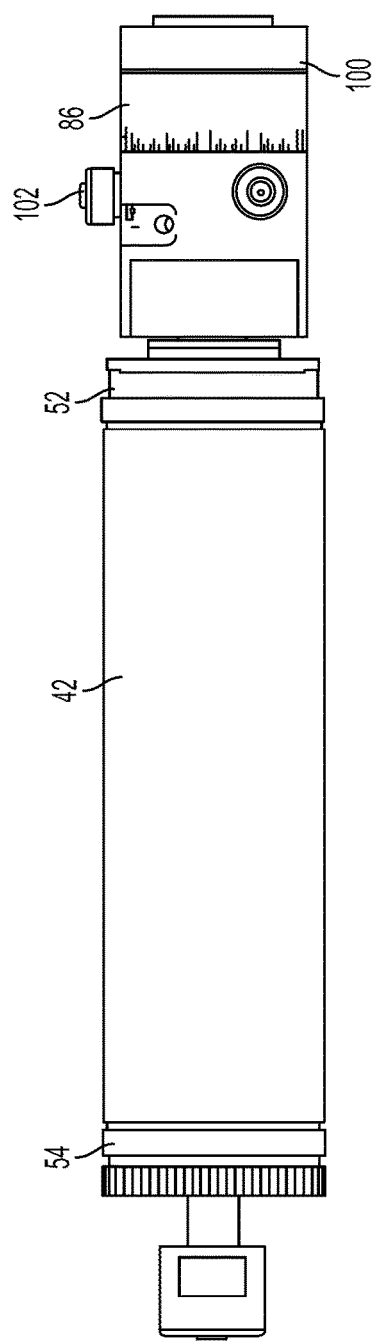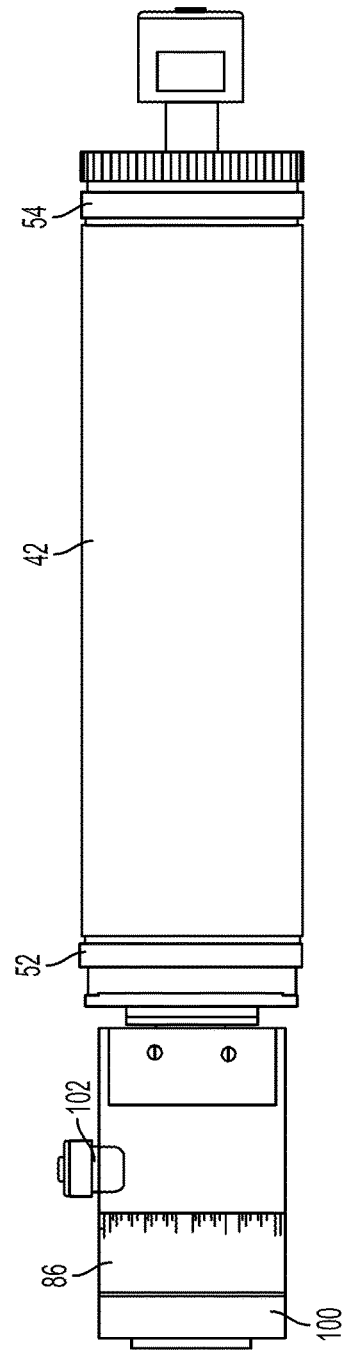

ANVIL ROLL AND INTERNAL ADJUSTMENT MECHANISMS THEREFOR

RELATED APPLICATION DATA

This application claims the benefit of provisional application Ser. No. 62/073,226, filed Oct. 31, 2014, the disclosure of which is incorporated by reference herein.

BACKGROUND AND SUMMARY

The disclosure relates to an anvil roll with a radial adjustment feature. As will be described in greater detail below, the radially adjustable anvil roll comprises a generally hollow cylinder anvil sleeve, a shaft, and a pair of eccentrics on the shaft, and a pair of bearer rolls. The anvil roll has an internal adjustment mechanism which cooperates with eccentrics that are located on longitudinally opposite ends of the anvil roll. Additionally, the internal adjustment mechanism includes an additional eccentric on one end of the anvil roll for setting the depth of cut on one end of the anvil roll. An external adjustment mechanism for an anvil roll is also disclosed. The external adjustment mechanism allows for setting a radial offset between an anvil roll sleeve and longitudinally opposite bearers. The external adjustment mechanism also allows for setting a radial offset for one of the bearers relative to the other of the bearers. In particular, the external adjustment mechanism cooperates with eccentrics that are located on longitudinally opposite ends of the anvil roll, and an additional eccentric for setting the depth of cut on one end of the anvil roll.

BRIEF DESCRIPTION OF THE DRAWINGS

FIGS. 1-8 show various views of an anvil roll with an external adjustment mechanism connected thereto.

DETAILED DESCRIPTION

Figure 1:
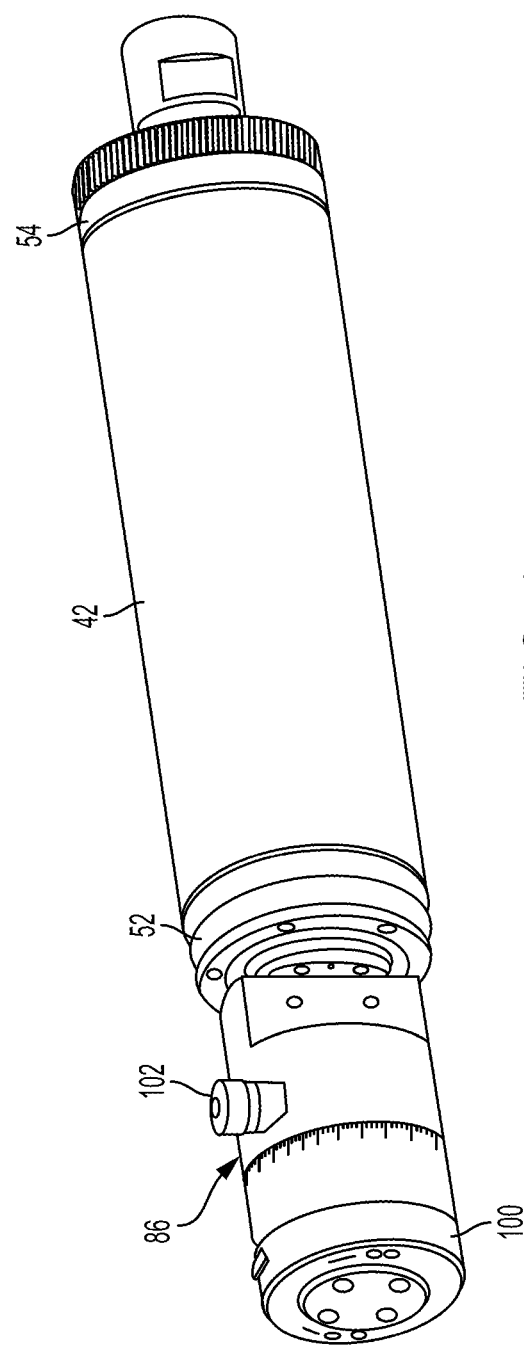
Figure 2:
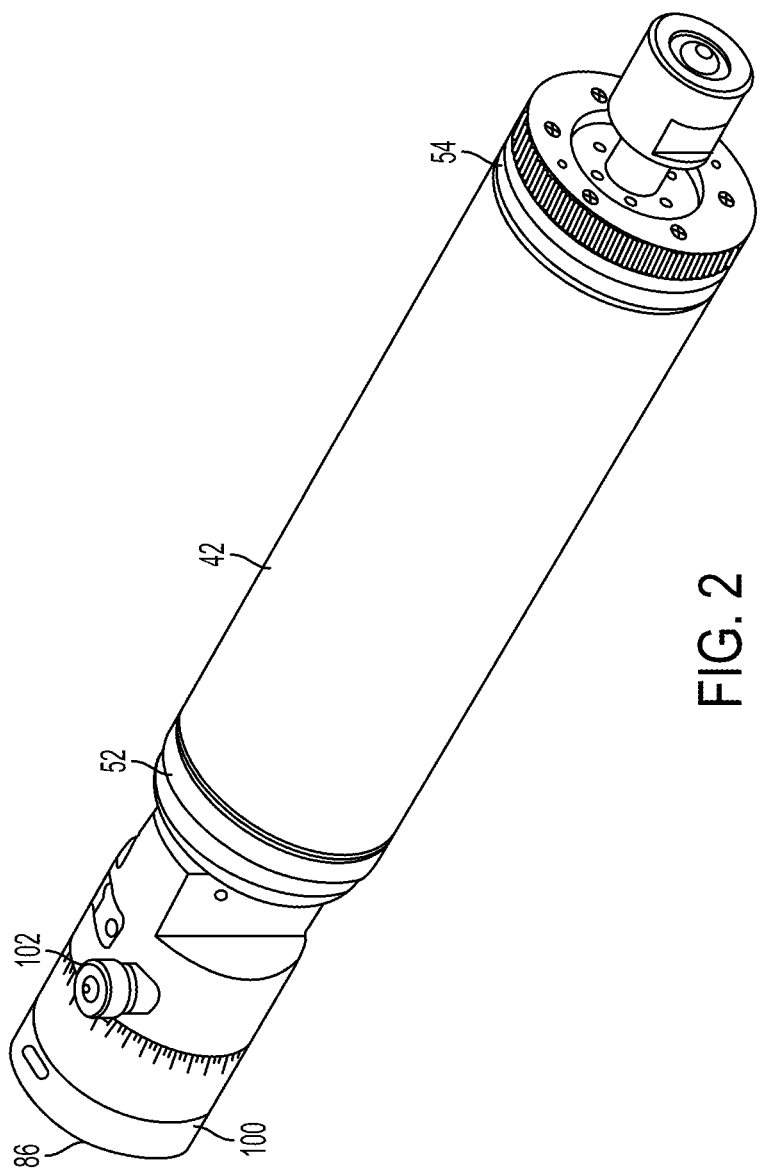
Figure 7:
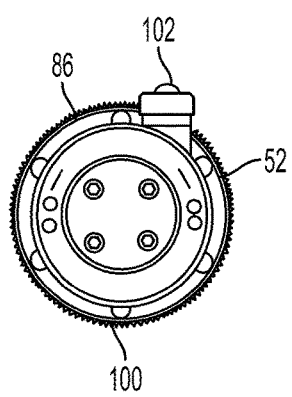
Figure 8:
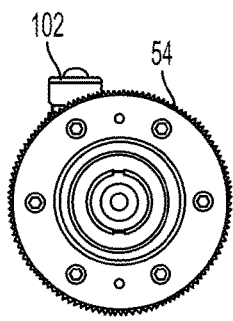

The terms near side and far side are used below merely for illustrative purposes with reference to features closest and farthest to the anvil roll adjustment knob as shown in the drawings. The terms are not to be construed in any limiting sense.

One method of adjusting a depth of cut for an anvil roll is disclosed in U.S. Pat. No. 5,083,488, the disclosure of which is incorporated herein by reference. The anvil roll may be used in connection with a conventional rotary die cutting press which uses a rotary die cutting cylinder. The media to be processed is disposed between the rotary die cutting cylinder and the anvil roll. Radial depth of cut refers to the spacing between the anvil roll and the rotary die cutting cylinder.

As described herein, the radially adjustable anvil roll assembly 40 comprises a hollow cylindrical anvil sleeve 42, a shaft 44, a pair of first eccentric surfaces 46,48, a second eccentric surface 50, and a pair of bearers 52,54. The anvil sleeve 42 is an elongate cylinder having a hollow internal bore. The cylindrical exterior or outer diameter surface of the anvil sleeve 42 serves as the anvil surface which opposes the cutting edges of the die cutting cylinder. Generally speaking, the inner and outer diameters of the anvil sleeve 42 are circular and may be constant across the axial length of the anvil sleeve. The side wall between the inner and outer surfaces of the anvil sleeve 42 is sufficiently thick to avoid deformation of the sleeve while in use.

The shaft 44 extends through the hollow interior of the anvil sleeve 42 and may be formed as an elongate body which may have an axial length longer than the axial length of the anvil sleeve 42. The shaft 44 may have a constant diameter central portion that extends along the majority length of the anvil sleeve 42. The central portion may transition to the pair of first eccentric surfaces 46,48 on longitudinally opposite ends of the anvil sleeve. The first eccentric surfaces may also be positioned elsewhere on the shaft, e.g., in the center. As shown in the drawings, the near side first eccentric surface is indicated with reference character 46 and the far side first eccentric surface is indicated with reference character 48. The first near and far side first eccentric surfaces 46,48 may be integral with (for instance, separate from and secured to) the shaft or monolithically formed with the shaft. The near and far side first eccentric surfaces 46,48 have a center line that may be radially offset or spaced a small distance from the center axis of the shaft 44. Thus, the axis of rotation of the anvil sleeve 42 is coaxial with the center axes of the first eccentric surfaces 46,48, and is parallel to and spaced radially from the center axis of rotation of the shaft 44.

Figure 9:
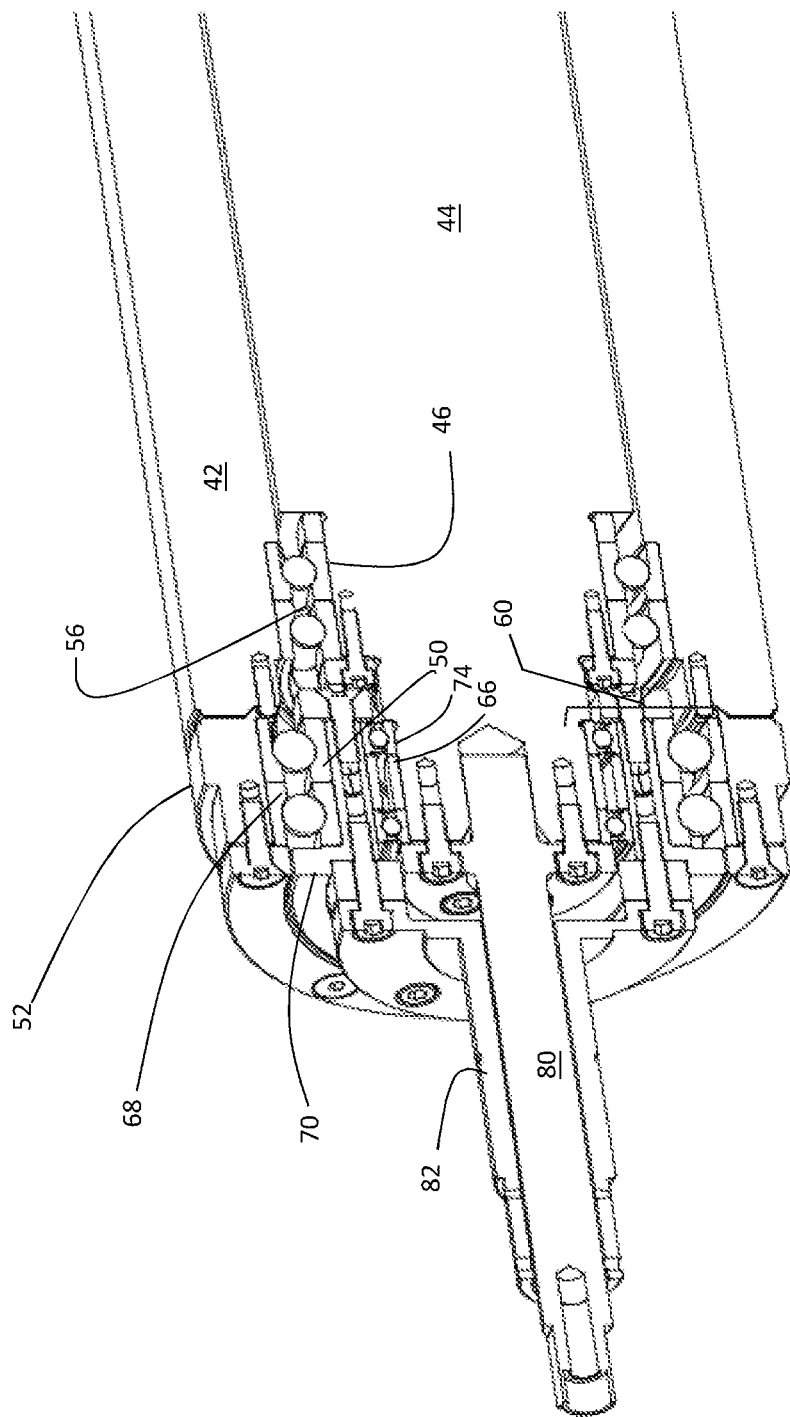
FIGS. 9-12 show cross-sectional views of the near side of the anvil roll of FIGS. 1-8.
Figure 10:
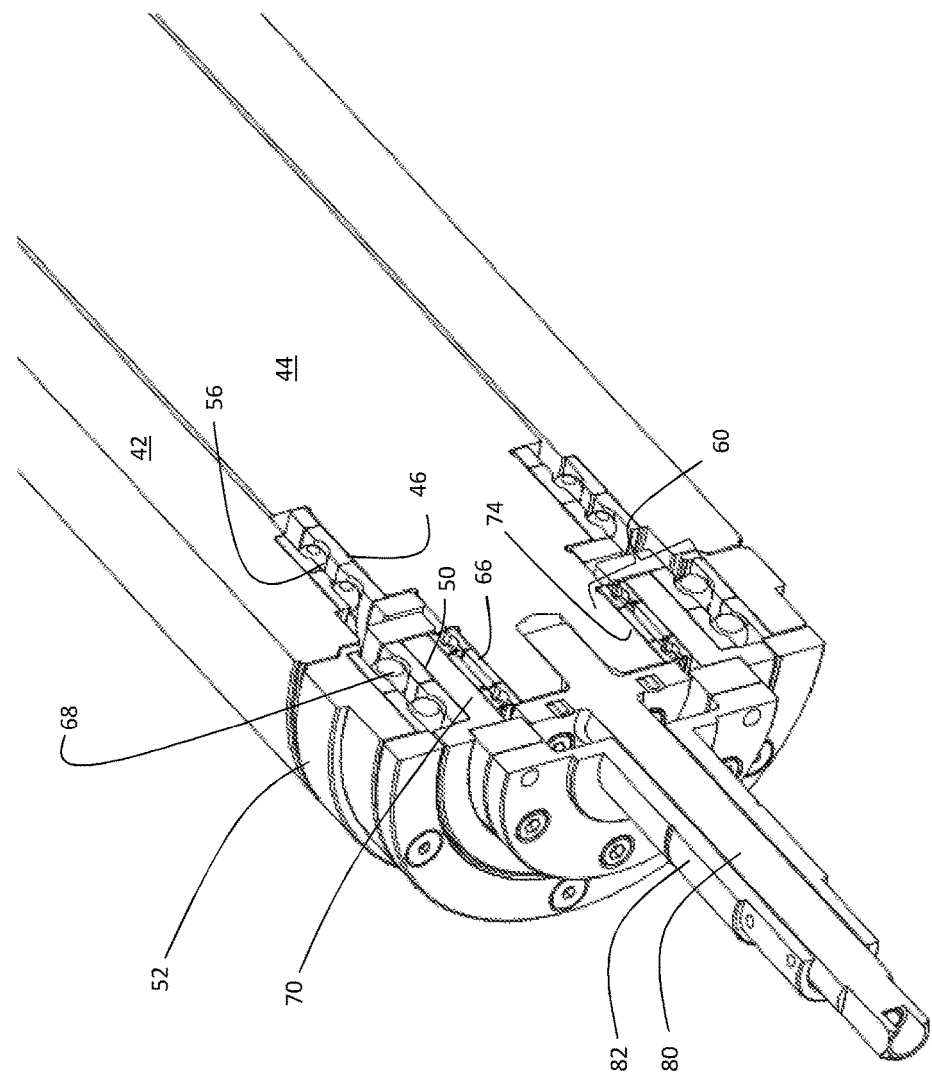
Figure 11:
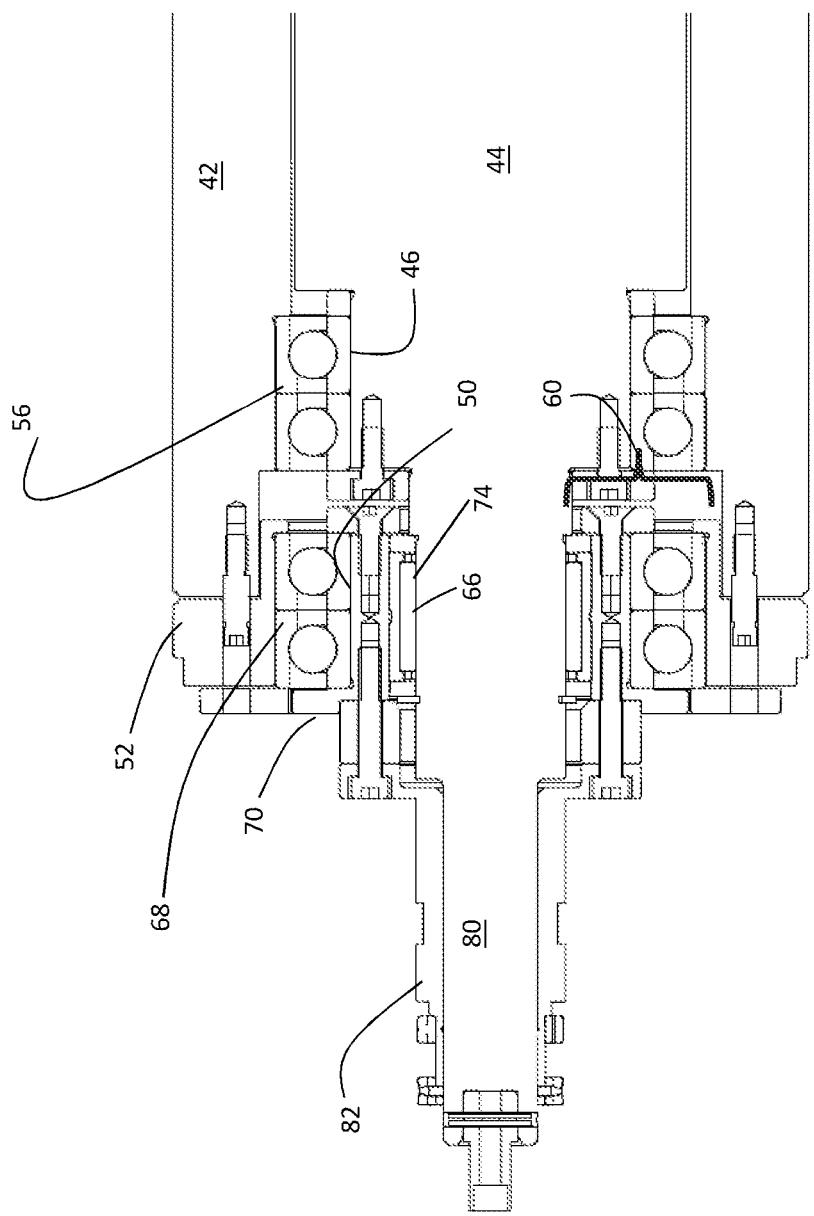
Figure 12:
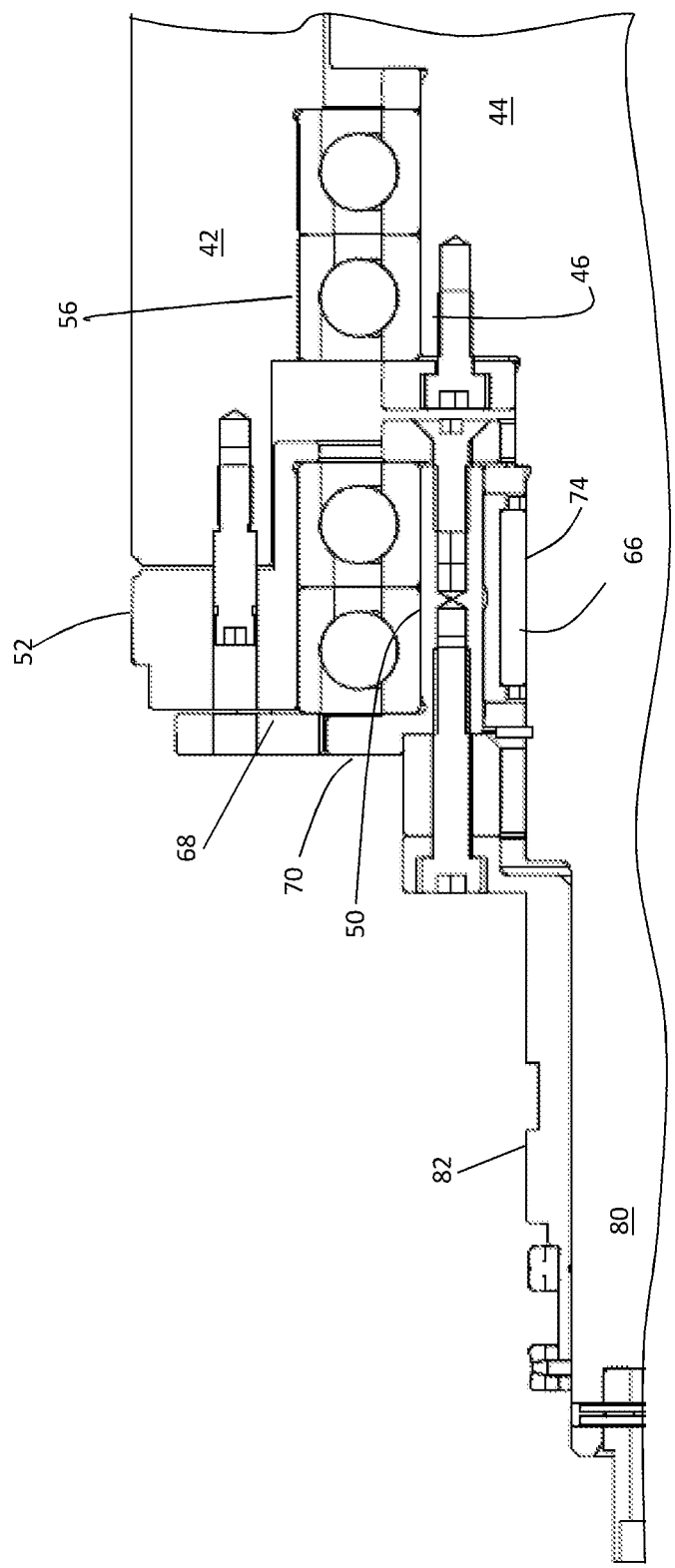
Figure 13:
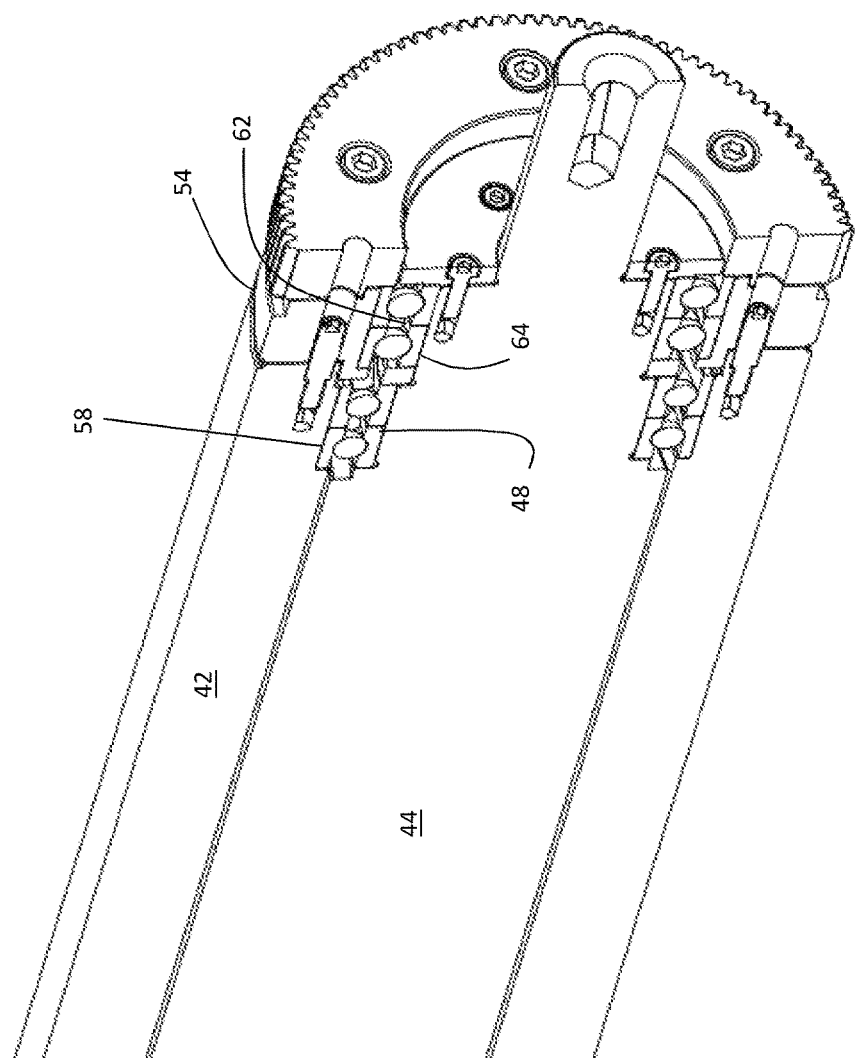
FIGS. 13-16 show cross-sectional views of the far side of the anvil roll of FIGS. 1-8.
Figure 14:
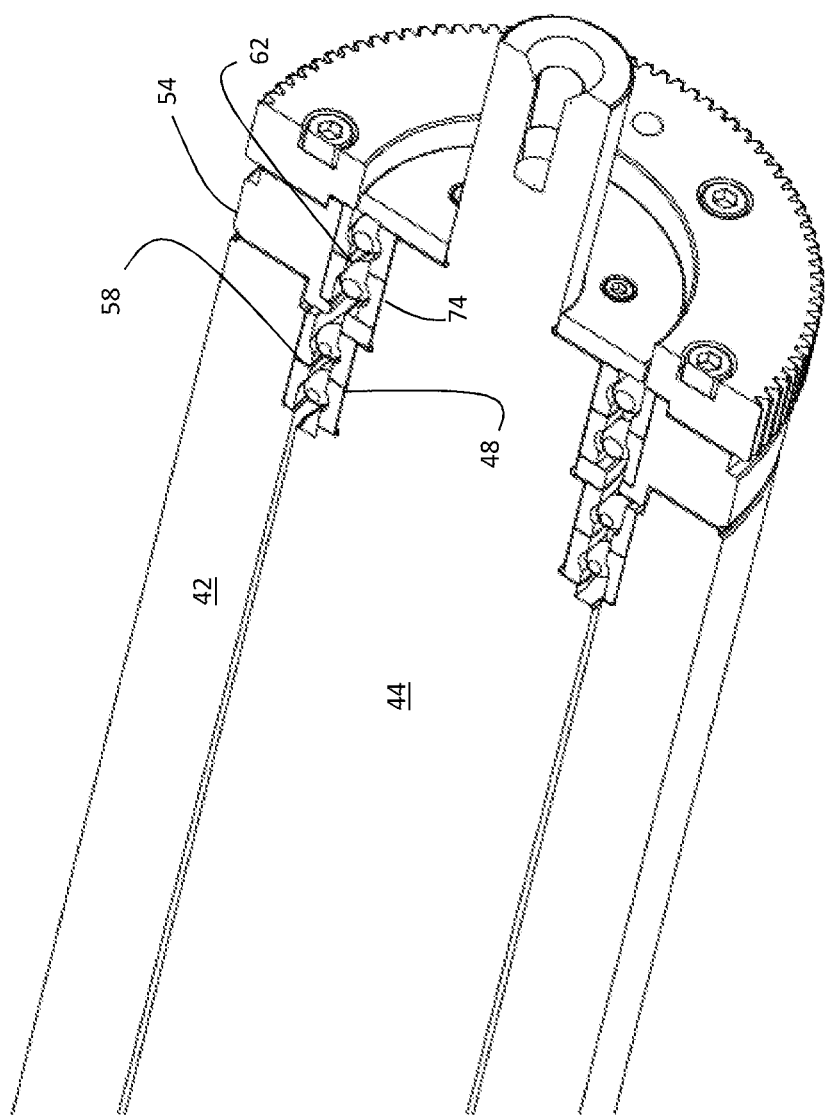
Figure 15:
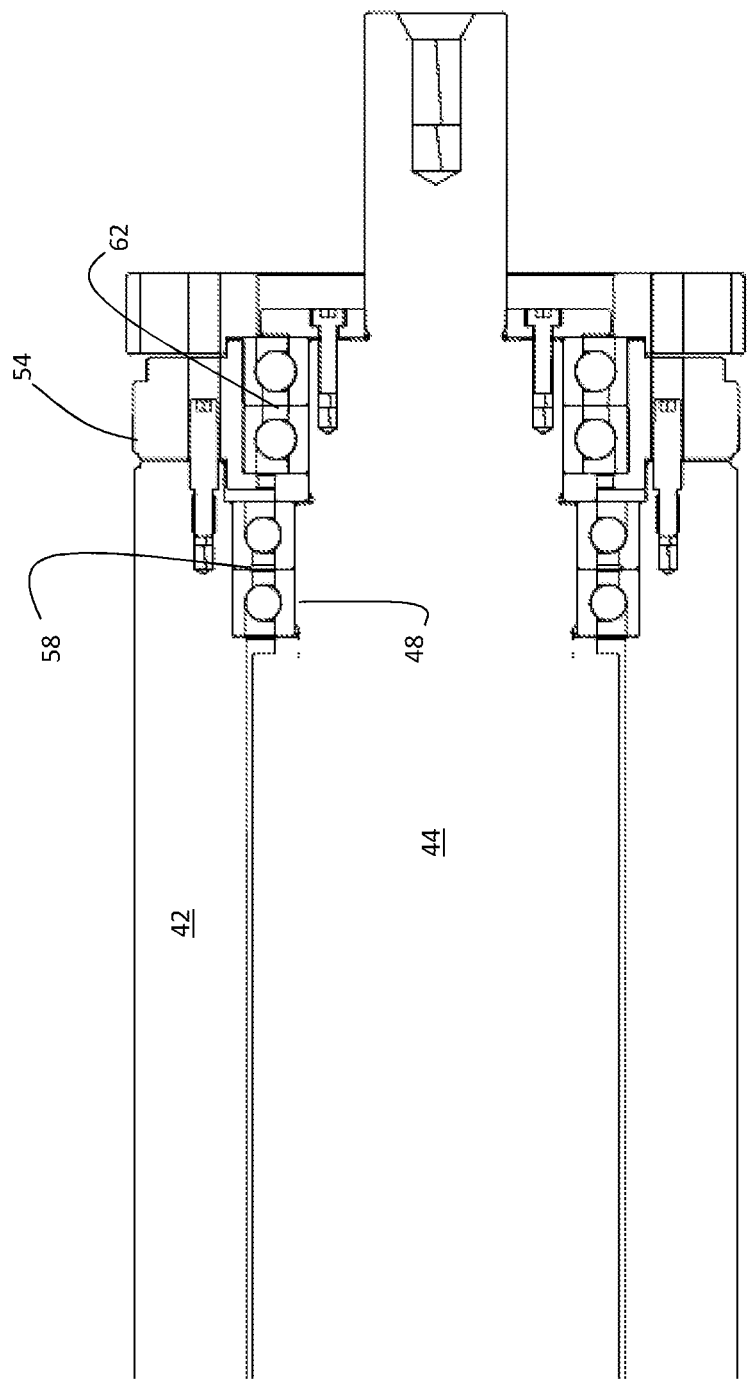
Figure 16:
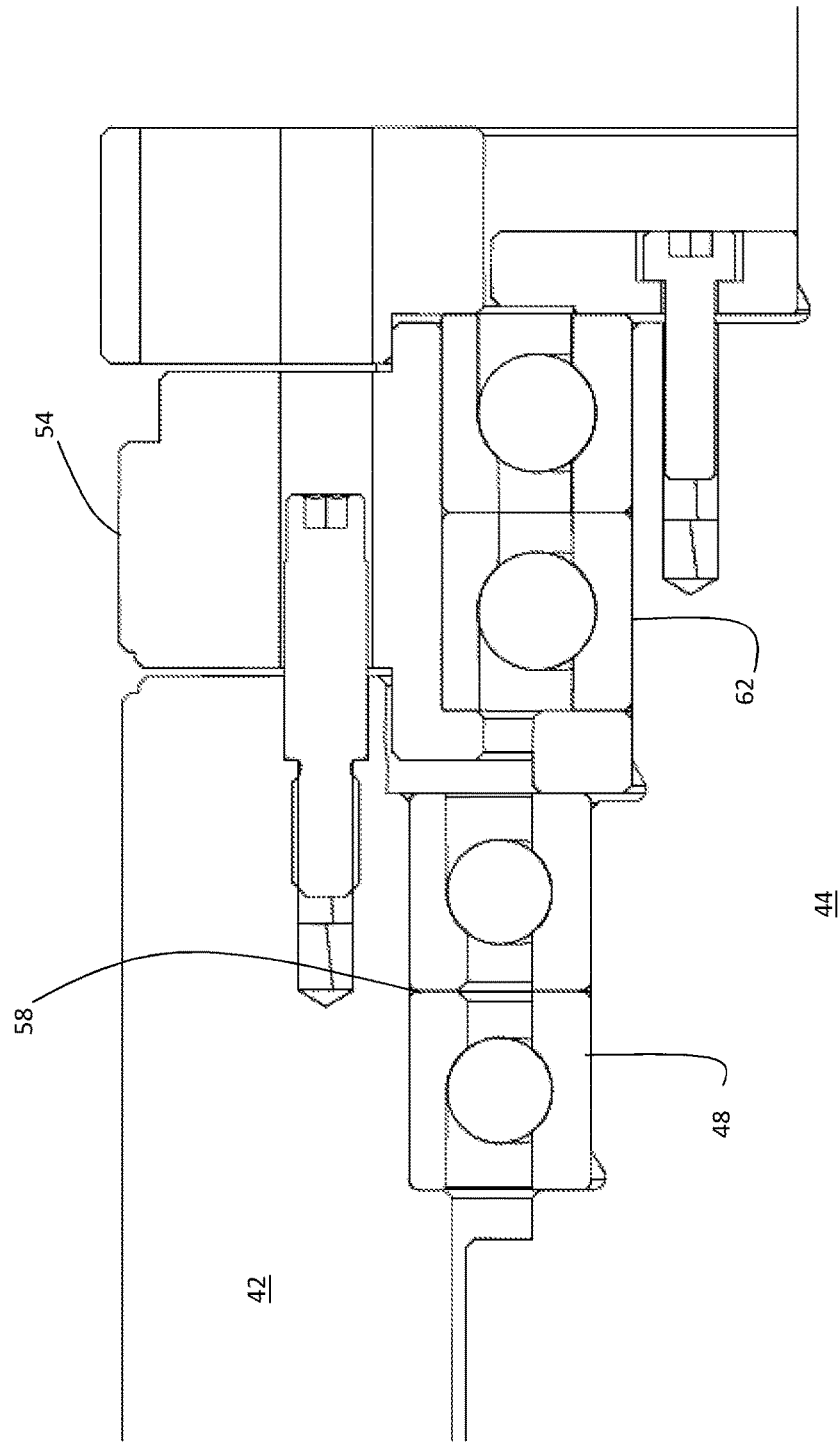
Figure 17:
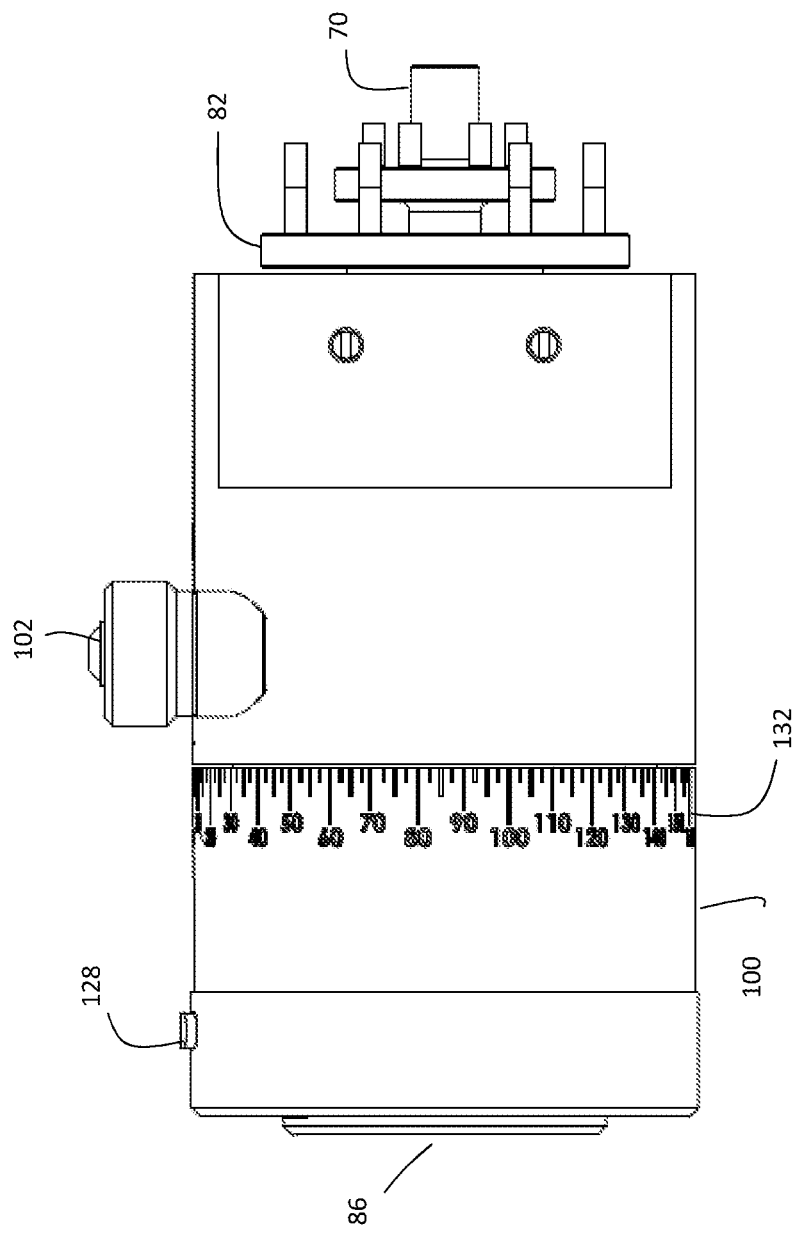
FIGS. 17-28 provide detail of one embodiment of an external adjustment mechanism.
Figure 18:
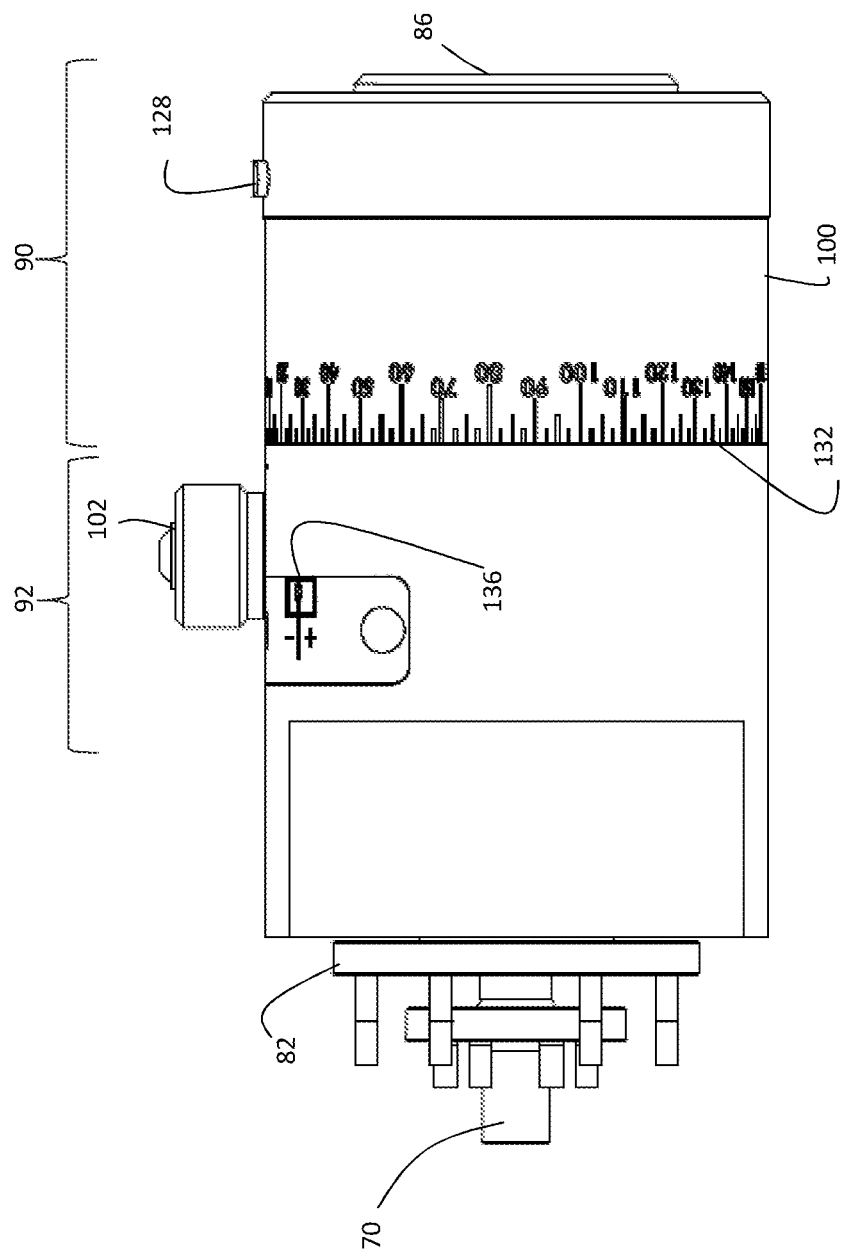
Figure 19:
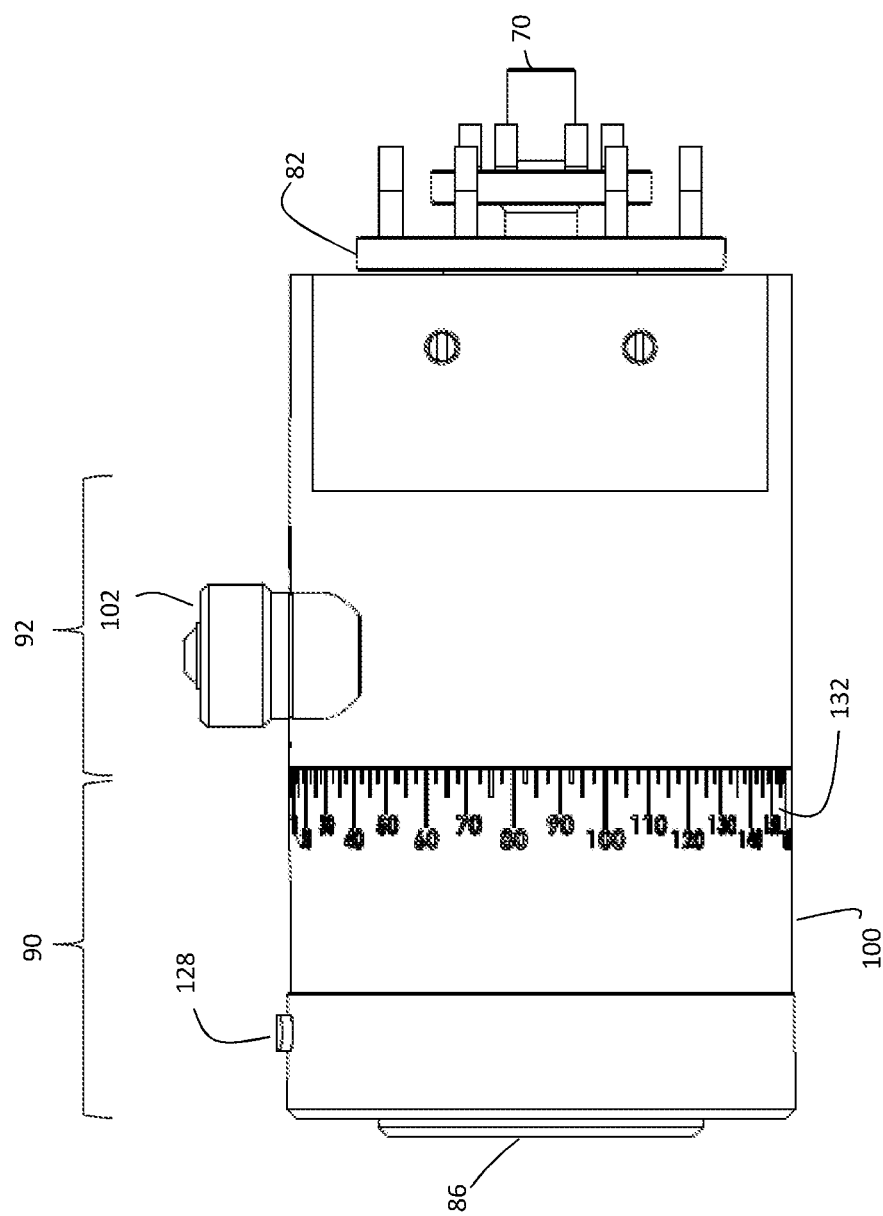
Figure 20:
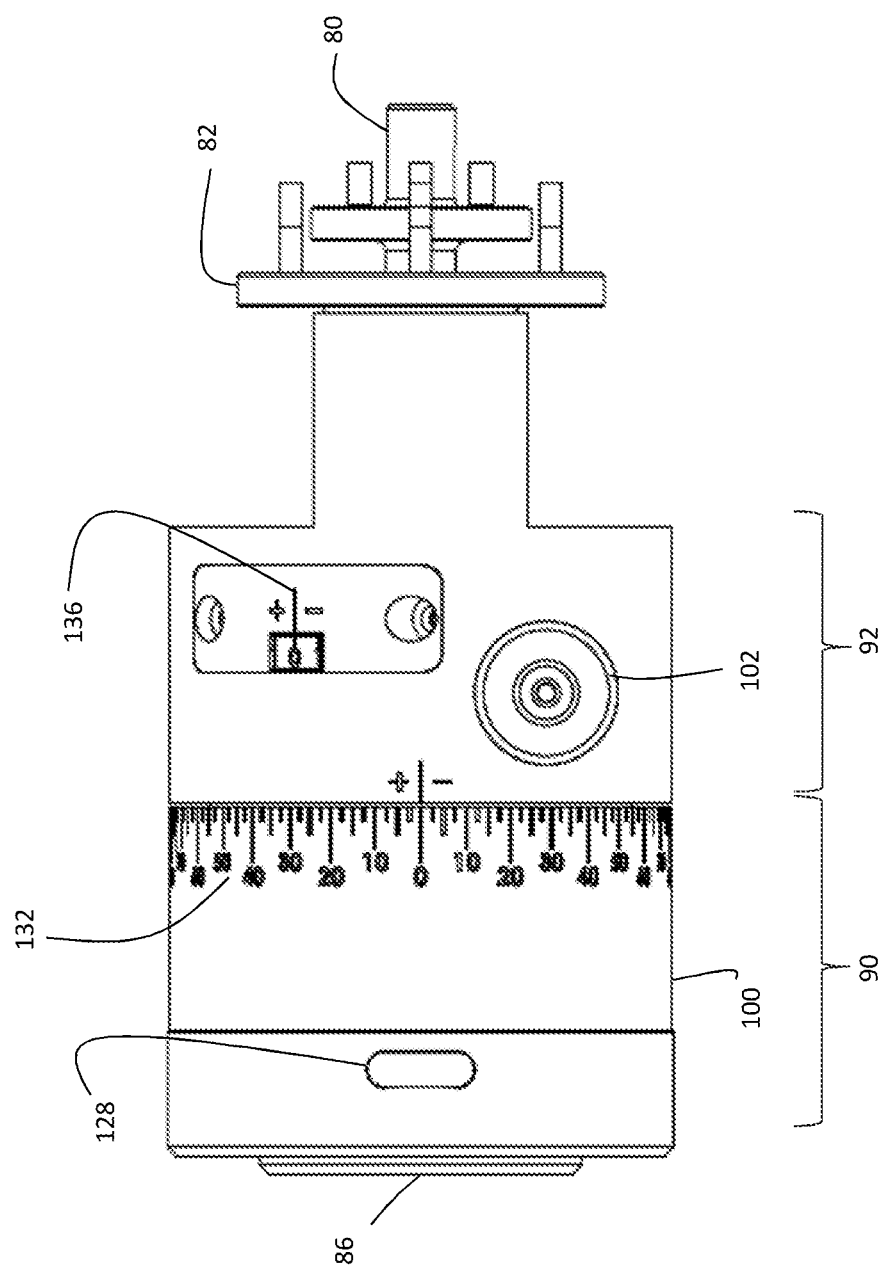
Figure 21:
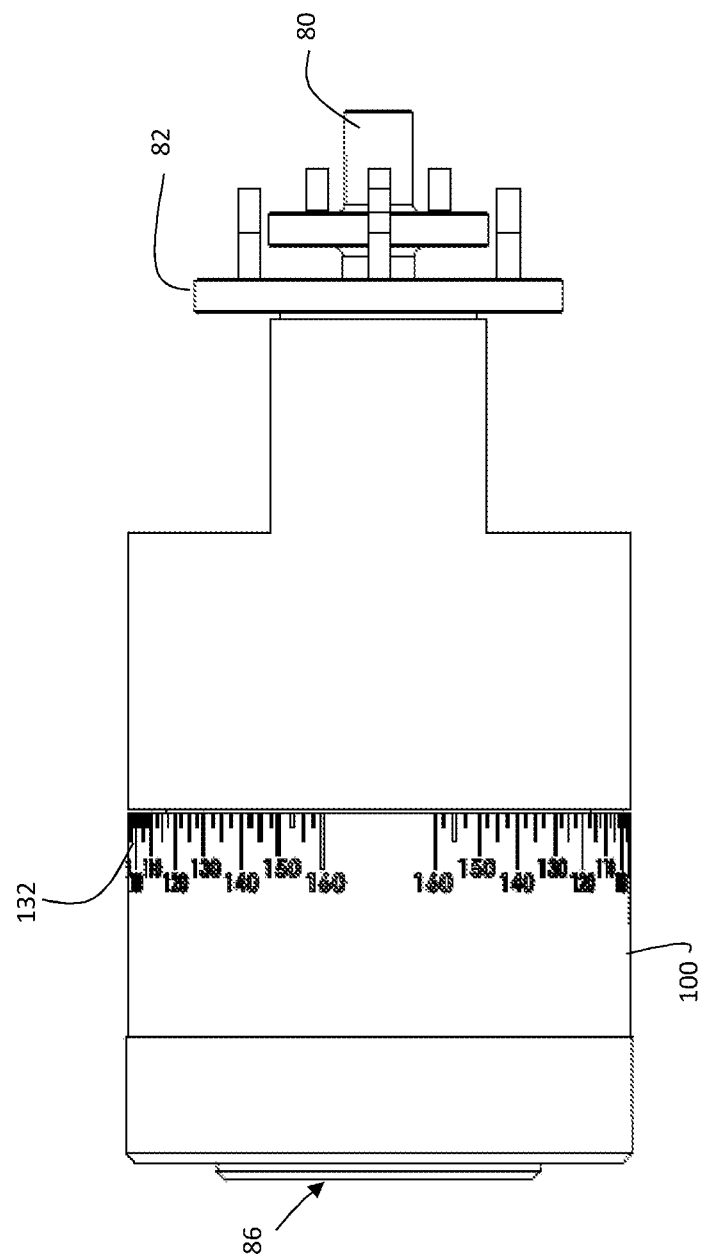
Figure 22:
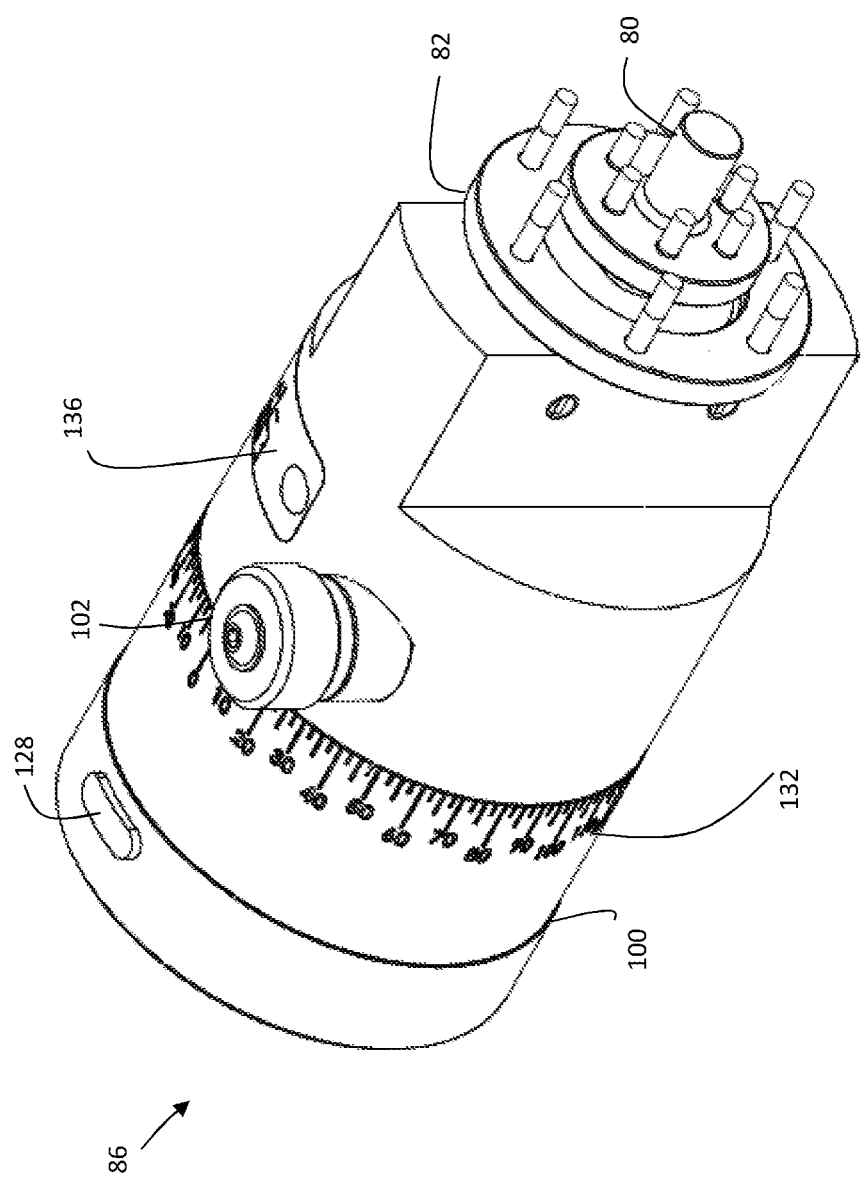
Figure 23:
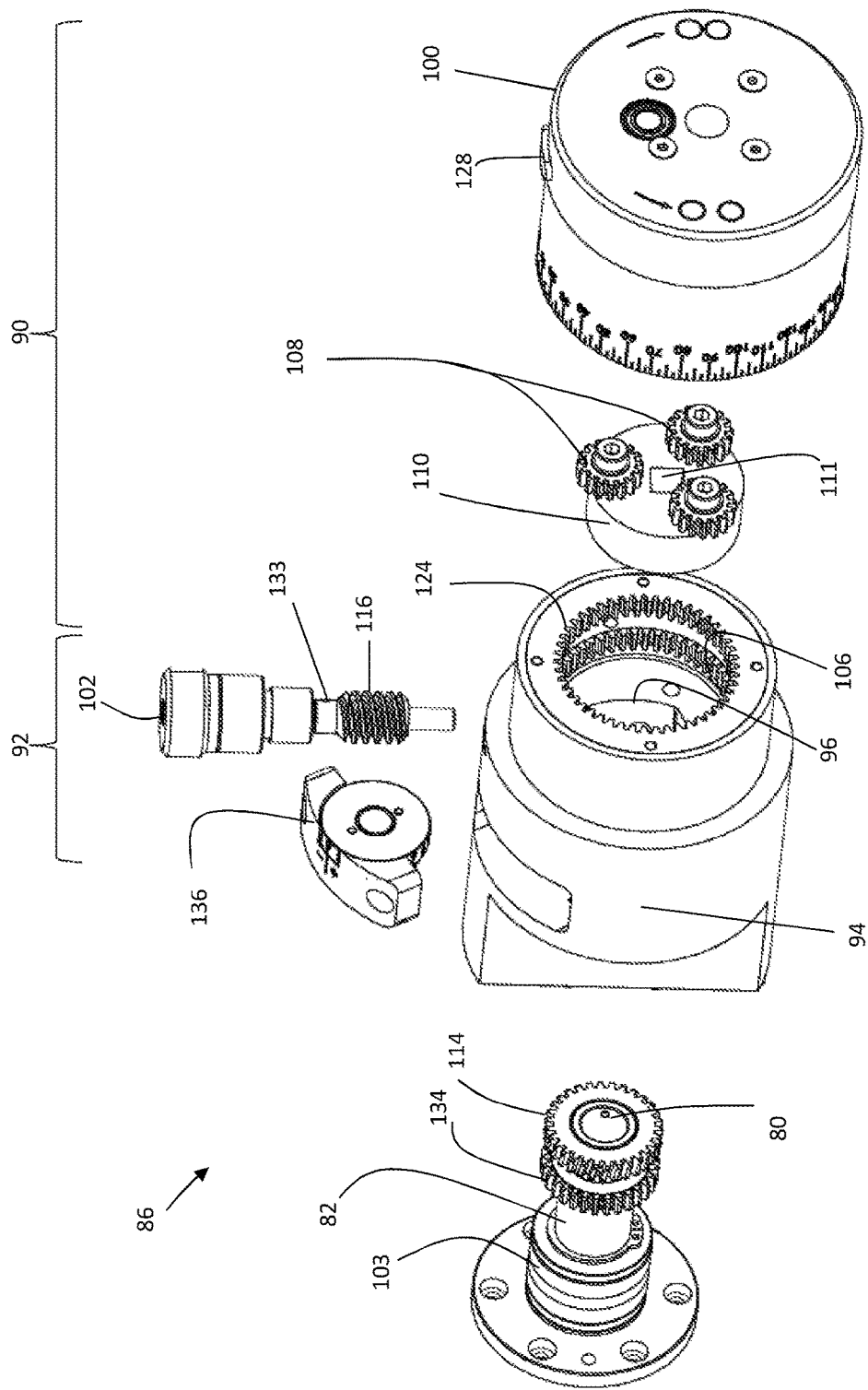
Figure 24:
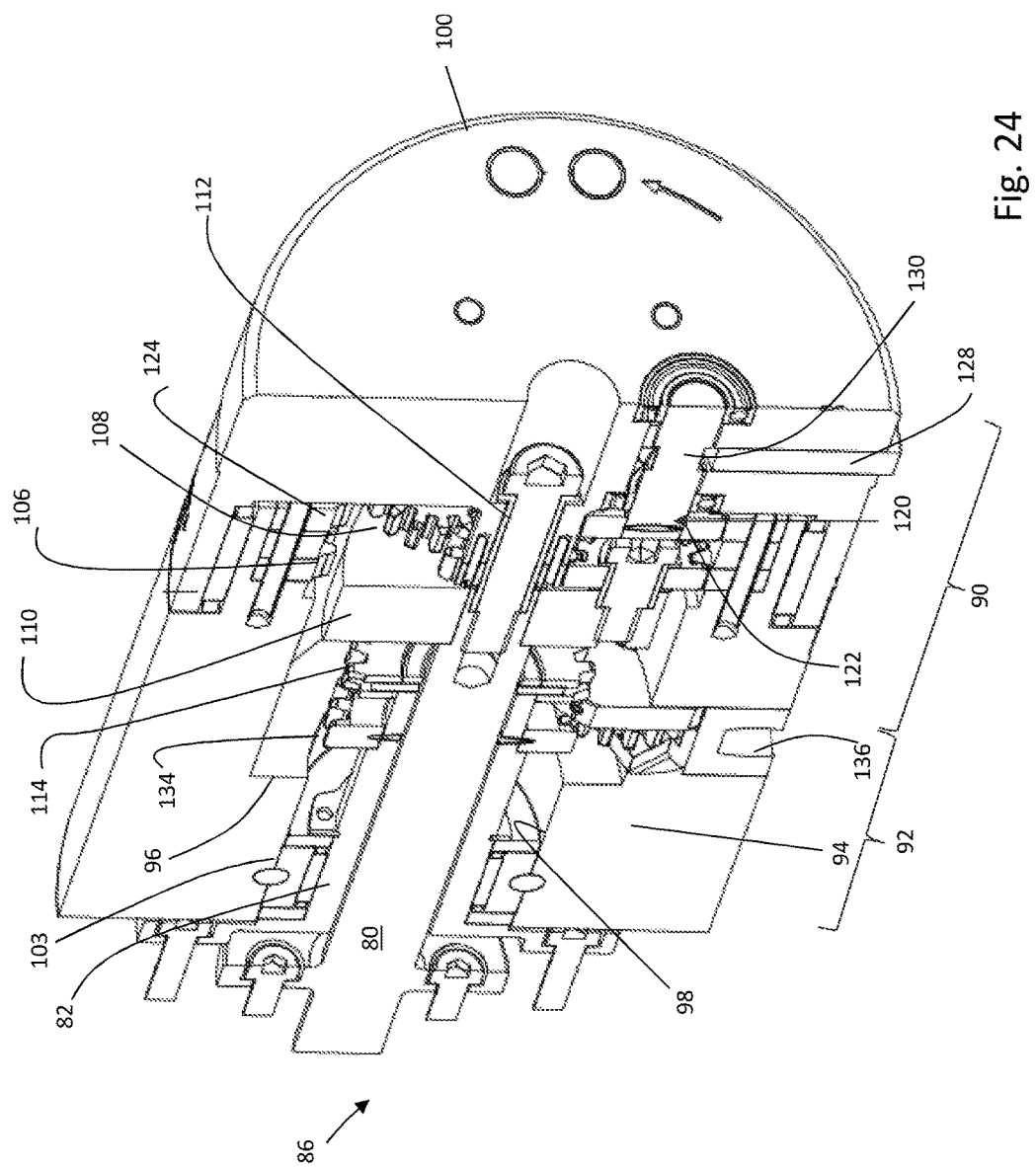
Figure 25:
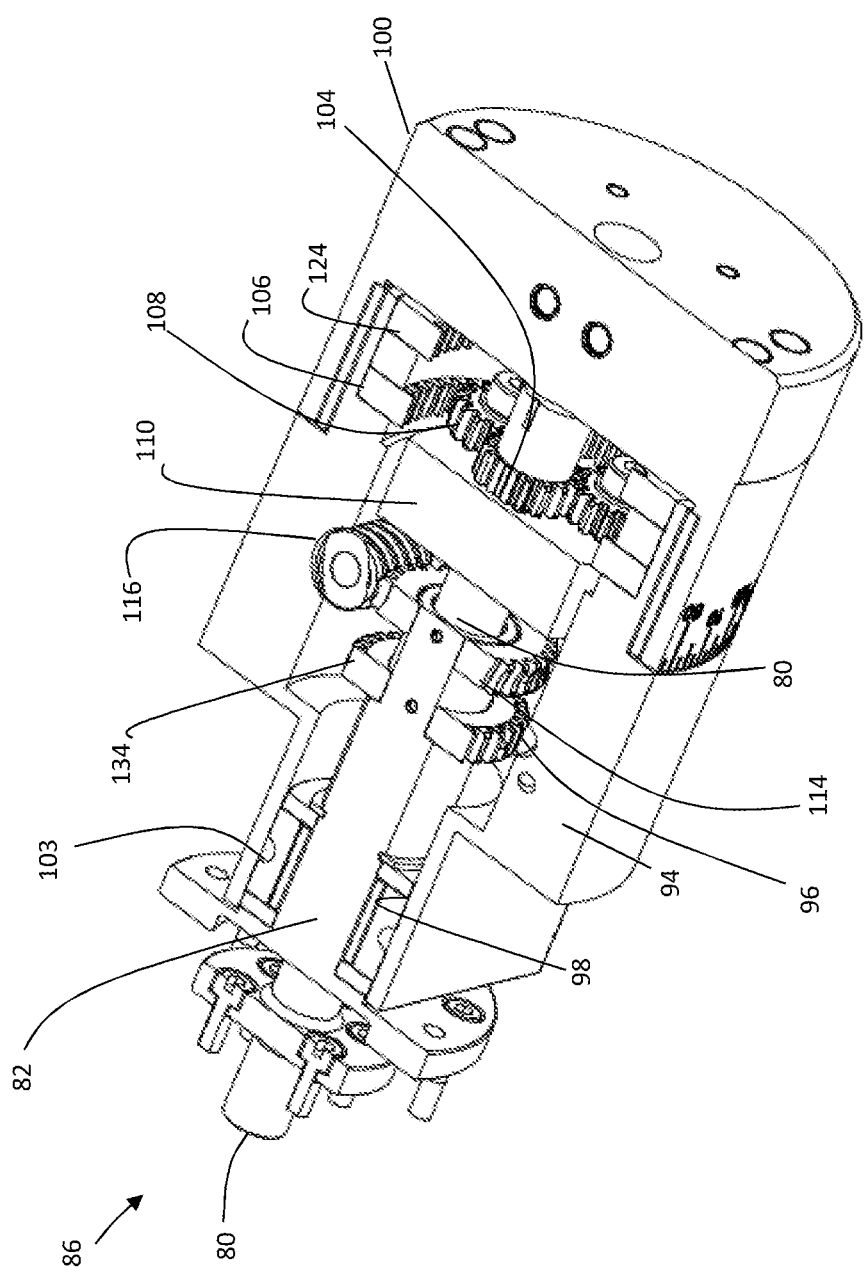
Figure 26:
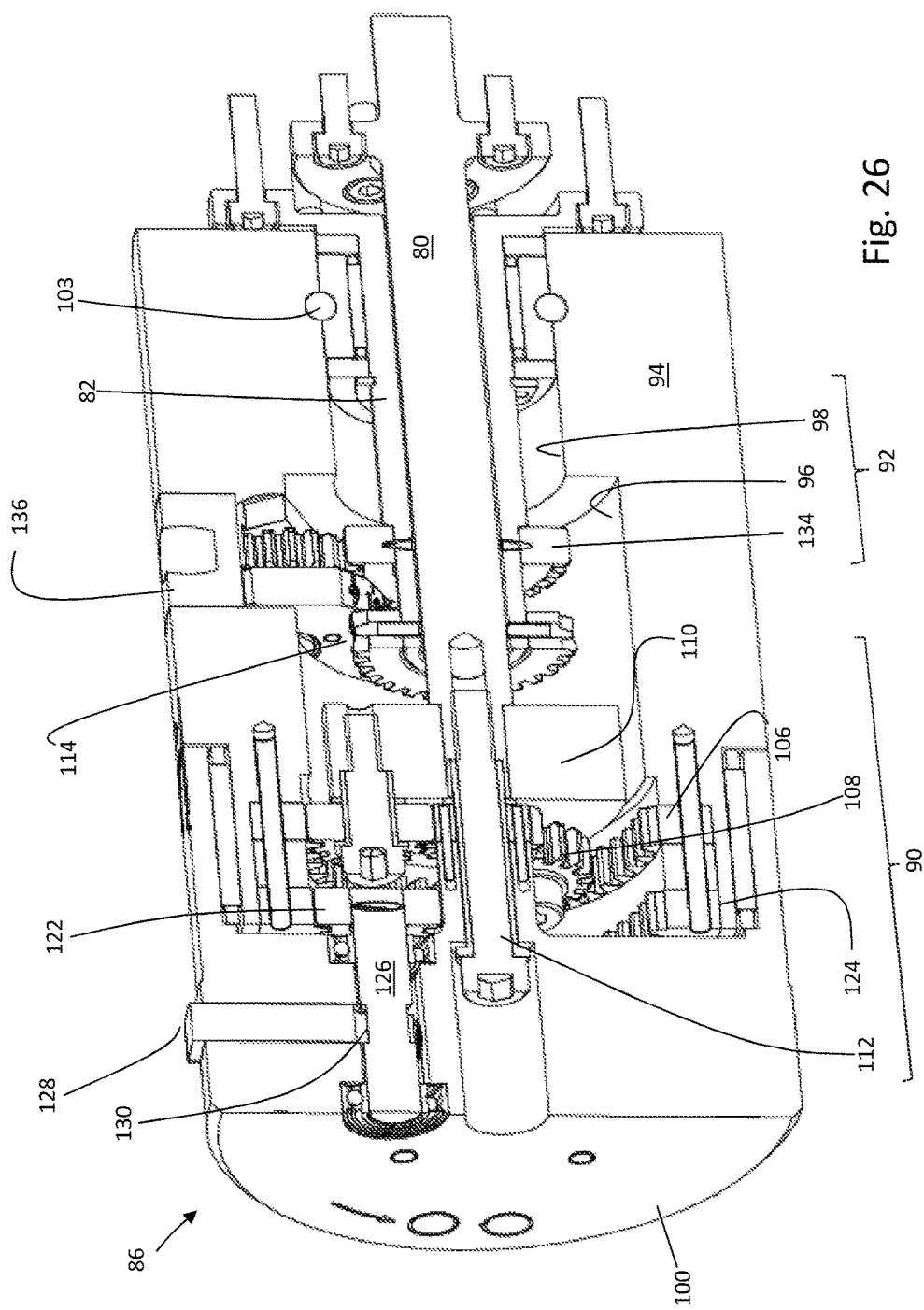
Figure 27:
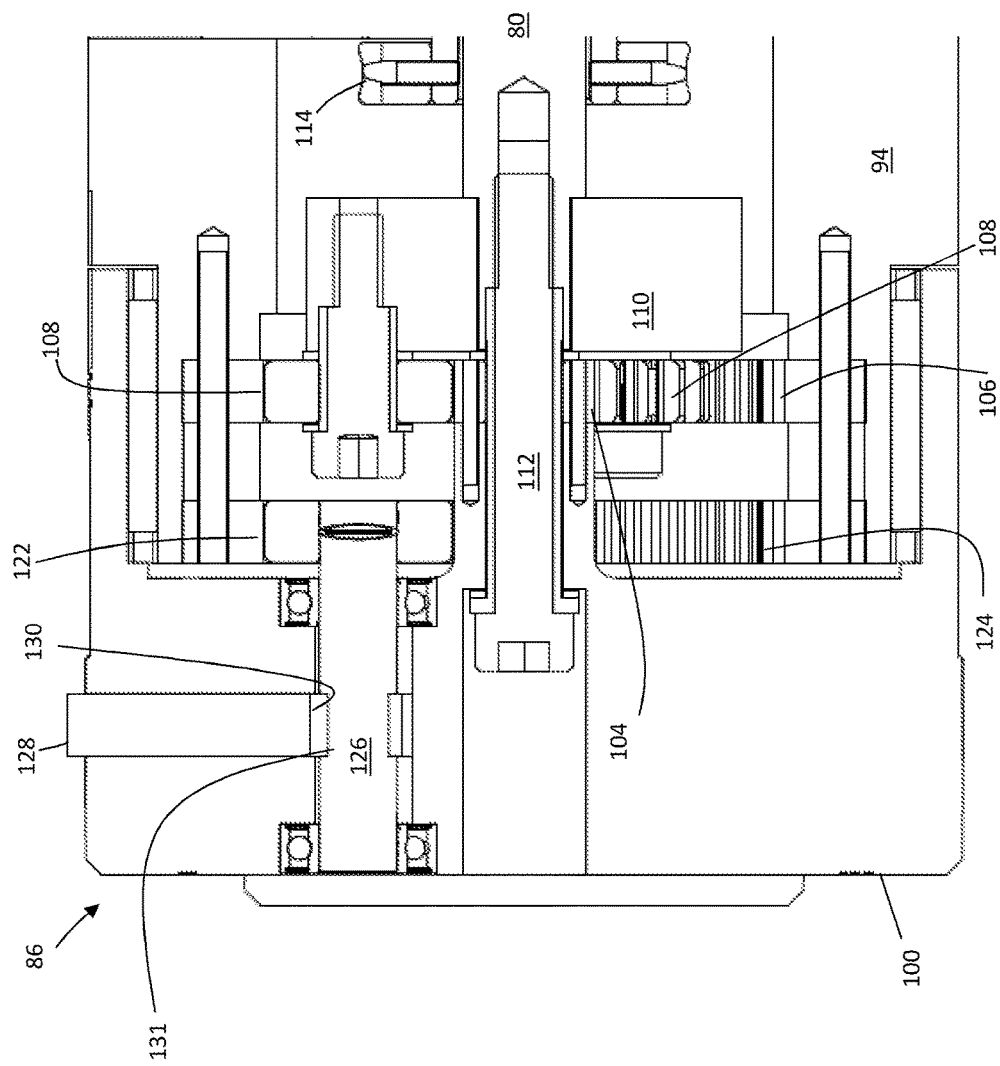
Figure 28:
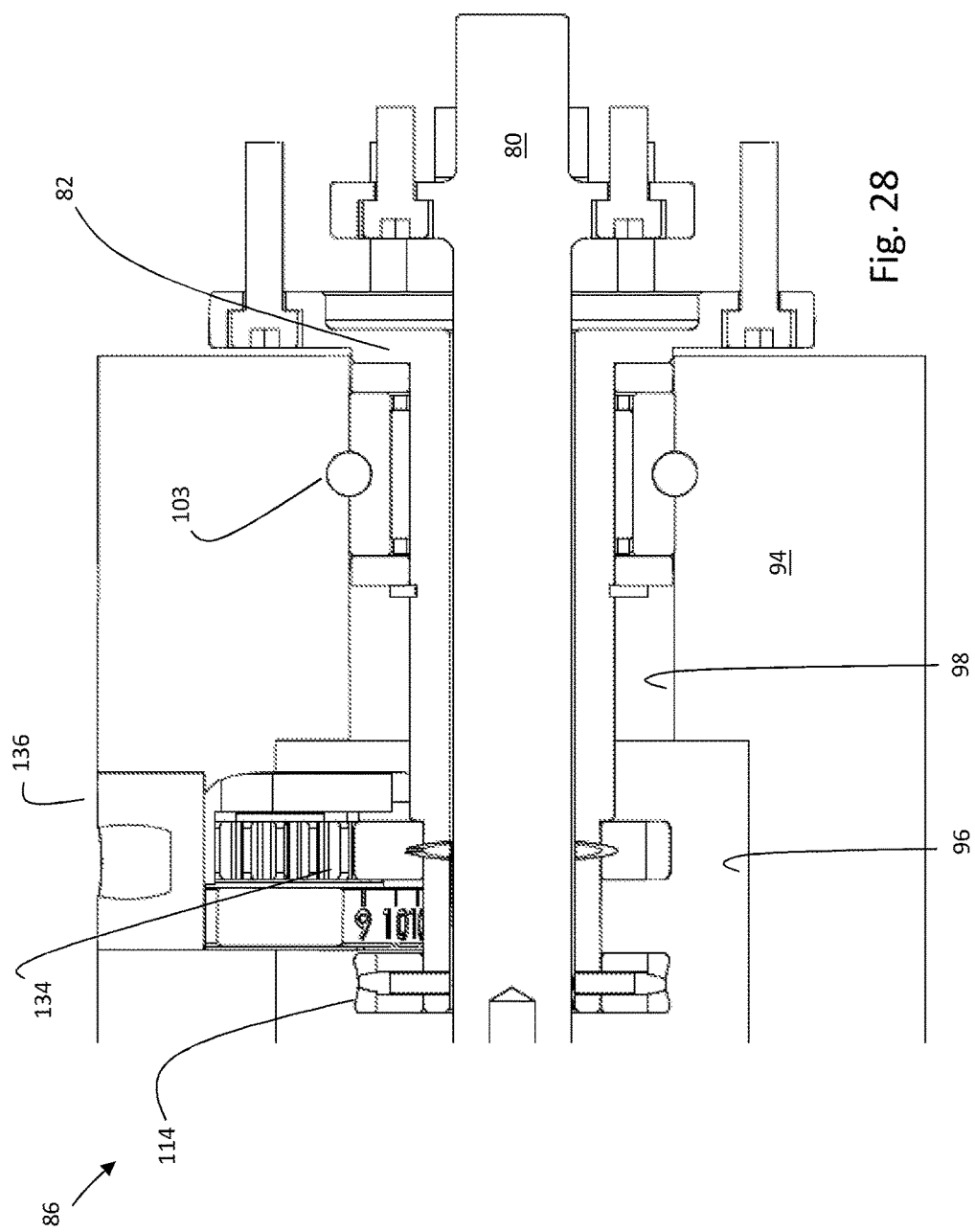

As shown in the drawings, the near and far sides of the anvil sleeve have bearing sets 56,58, with the inner race of each respective bearing set mounted to the respective first eccentric surface and the outer race of each respective bearing set mounted to the inner diameter surface of the anvil sleeve. The anvil sleeve bearing sets 56,58 mounted on the first eccentric surfaces 46,48 allow the anvil sleeve 42 to freely rotate on the shaft 44. The far and near side bearers 52,54 also each have bearing sets 60,62 that allow the respective bearer to rotate independent of the anvil sleeve 42 on the shaft 44. The bearers 52,54 may rotate concentrically with the center axis of the shaft 44. Thus, to set the depth of cut, the first eccentric surfaces 46,48 may be adjusted radially relative to bearers 52,54. As explained below, the first eccentric surfaces may be adjusted radially by rotating a mandrel 80 extending from the near side axial end of the shaft. As shown in FIGS. 9 and 10, the mandrel 80 is fixedly connected to the near side of the shaft. As shown in FIGS. 11 and 12, the mandrel 80 may also be monolithically formed with the shaft.

The far side bearer 54 has its bearing set 62 mounted to the shaft 44. The far side bearer bearing set 62 may be mounted to a step 64 formed on the shaft. The step 64 formed on the shaft 44 may be outboard of the far side first eccentric surface 48 and may have a smaller diameter than the first eccentric surface 48. The far side bearer bearing set 62 may rotate concentric with the shaft 44.

The near side bearer 52 has its bearing set 60 formed with inner and outer sub-bearing sets 66,68. The near side bearer inner and outer sub-bearing sets 66,68 may be located axially outward of the first eccentric surface 46 on the near side of the anvil roll assembly 40. The near side bearer inner and outer sub-bearing sets 60,68 may be separated radially by a carrier 70. The carrier 70 may engage the inner race of the near side bearing outer bearing set 68 and the outer race of the near side bearing inner bearing set 66. The carrier 70 may comprise the second eccentric surface 50. The carrier 70 may have a cylindrical outer surface and a cylindrical inner surface. The carrier cylindrical outer surface may have its center offset from a center of the carrier cylindrical inner surface in order to create the offset needed for the second eccentric surface 50. The second eccentric surface may also be formed on a race of the inner and outer sub-bearing sets. The near side bearer inner and outer sub-bearing sets 66,68 allow the carrier 70 to rotate independently of the shaft 44, thereby allowing the second eccentric surface 50 formed on the carrier to position the near side bearer 52 as desired. The near side bearer inner sub-bearing set 66 may be mounted to a step 74 formed on the shaft 44. The step 74 formed on the shaft 44 may be outboard of the near side first eccentric surface 50 and may have a smaller diameter than the near side first eccentric surface 46. The near side bearer inner sub-bearing set 68 may rotate concentric with the shaft 44. With the eccentricity provided by the carrier 70, the near side bearer outer sub-bearing set 68 may be eccentrically aligned with the shaft, thereby allowing the positioning of the near side bearer 52 independently of the anvil sleeve assembly 40. The second eccentric surface 50 may be set by rotating a sleeve 82 connected to the carrier. The sleeve 82 may be connected to the near side axial end of the carrier. The sleeve 82 may extend over the mandrel 80 used to set the first eccentric surface. The sleeve 82 may be coaxially aligned with the mandrel 80. Providing the second adjustment enables the anvil roll sleeve 42 to be positioned as needed where variation exists between the near and far sides of the anvil roll assembly 40.

Figure 29:
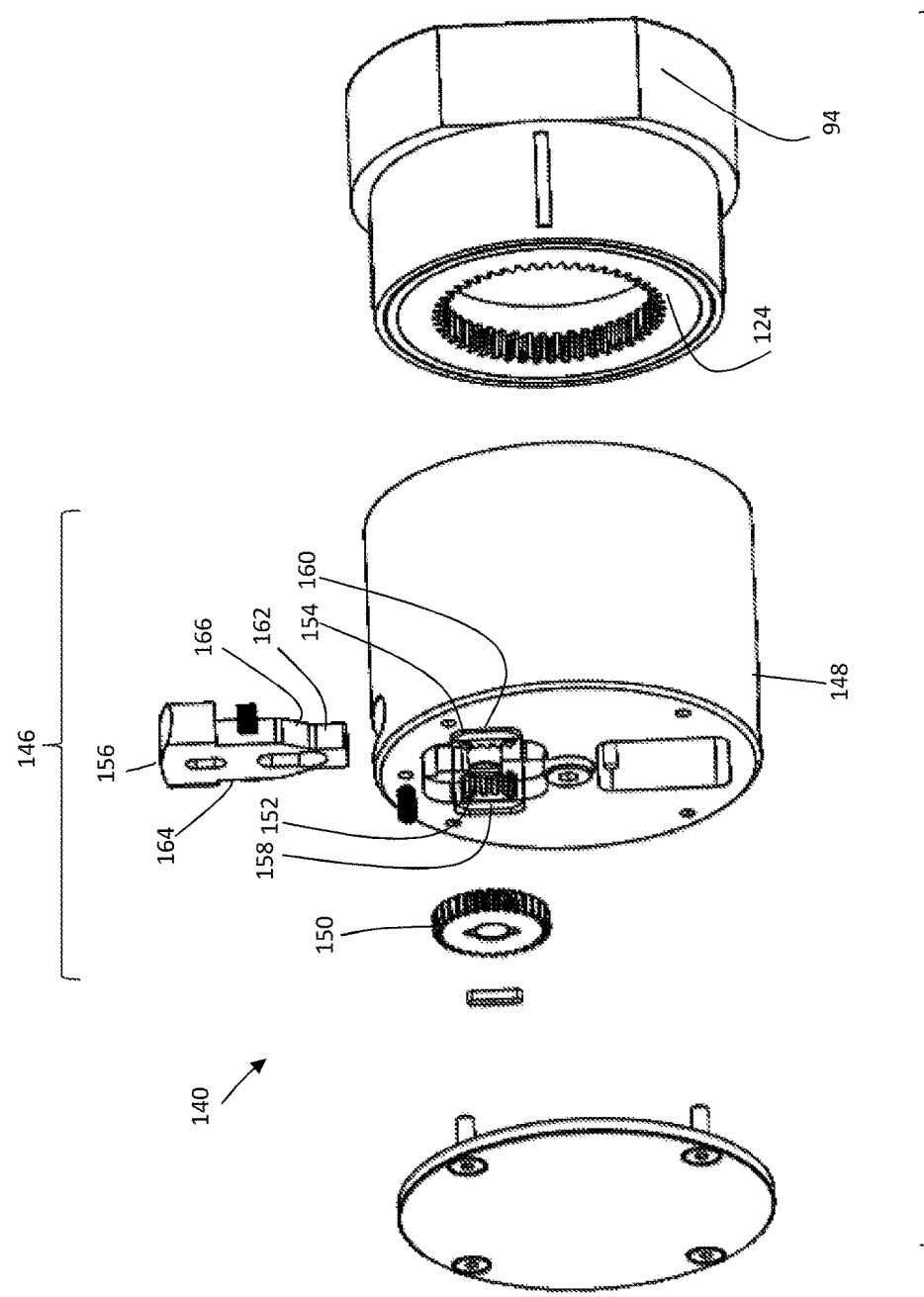
FIGS. 29-32 provide detail of an alternate embodiment of an external adjustment mechanism.
Figure 30:
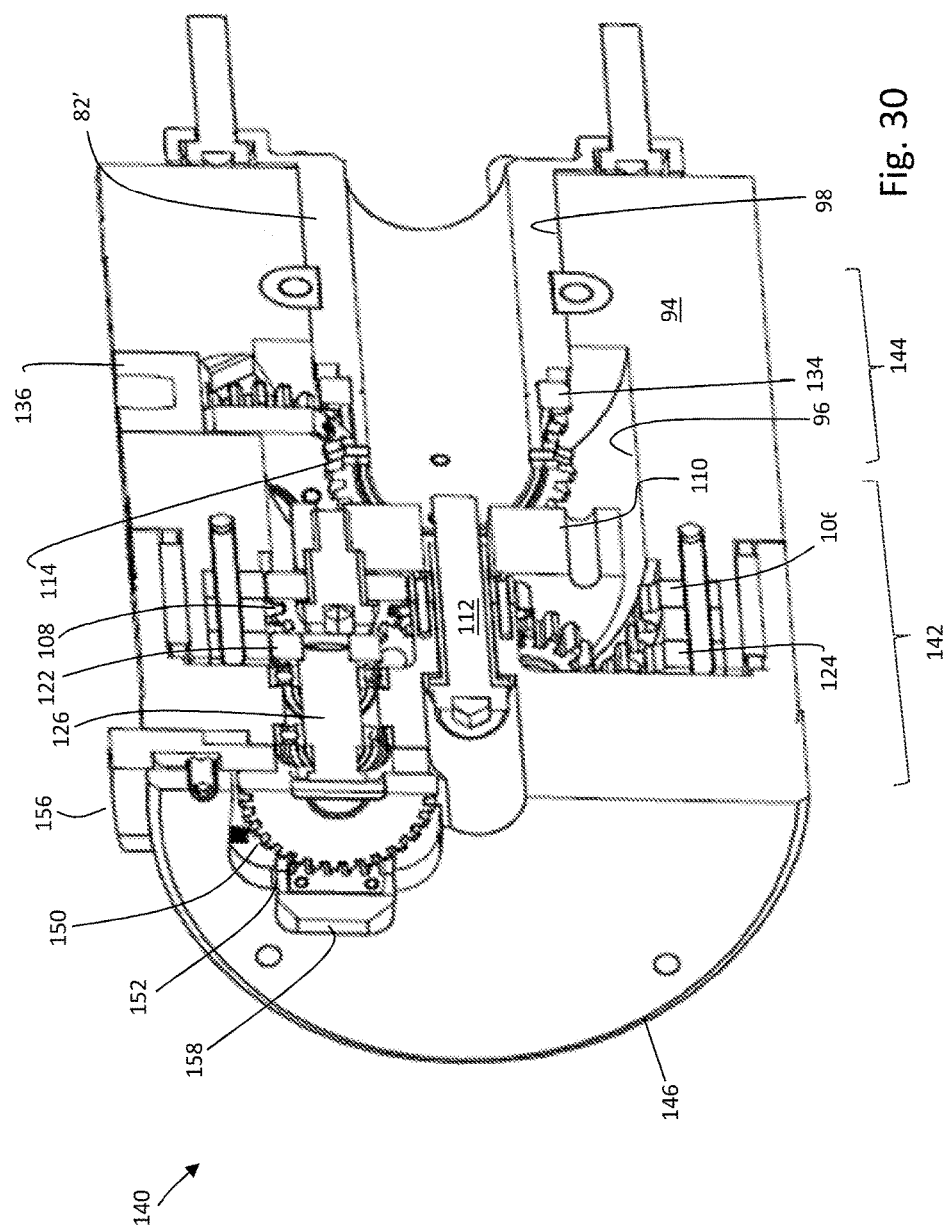

An adjustment mechanism 86 knob may be provided on the near side of the anvil roll assembly 40 to allow independent adjustment of the first eccentric surfaces 46,48 and the second eccentric surface 50. FIGS. 17-28 provide further detail of one embodiment of an adjustment mechanism. FIGS. 29-30 provide detail of a second embodiment of an adjustment mechanism. In both embodiments, the adjustment mechanism has a first adjustment drive 90 for adjusting the first eccentric surfaces 46,48 relative to the anvil sleeve, and a second adjustment drive 92 for adjusting the second eccentric surface 50 relative to the anvil sleeve. In both embodiments, the adjustment mechanism 86 comprises a body 94 having first and second axial ends, and a hollow interior 96 with a bore 98 extending from the first axial end to the hollow interior. The body first axial end may be arranged adjacent to the anvil roll assembly near side. The body hollow interior may contain at least a portion of the first adjustment drive 90 and the second adjustment drive 92.

The first adjustment drive 90 may be arranged adjacent to the second axial end of the body 94 and extend into the body hollow interior 96. The first adjustment drive may comprise a gear train with drive gears extending between a first adjustment operator 100 and the mandrel 80. The mandrel 80 may extend from the body hollow interior 96 through the bore 98 of the body to the first axial end of the body whereby rotation of the first adjustment operator 100 causes rotation of the drive gears and the mandrel 80. The mandrel in turn operatively engages the shaft to allow rotation of the shaft relative to the anvil roll to adjust the amount of eccentricity therebetween vis-à-vis the first eccentric surfaces 46,48.

The second adjustment drive 92 may be arranged intermediate of the first adjustment drive 90 and the first axial end of the body 94. The second adjustment drive 92 may comprises a gear train with drive gears extending between a second adjustment operator 102 and the sleeve 82. The sleeve 82 may extend from the body hollow interior 96 through the bore 98 of the body to the first axial end of the body whereby rotation of the second adjustment operator 102 causes rotation of the drive gears and the sleeve 82. The sleeve 82 may be configured to engage the carrier 70 and adjust the second eccentric 50 of the anvil roll assembly. The sleeve 82 may be rotatably connected to the body 94 in the bore 98 with a sleeve bearing 103. The first adjustment operator 100 may be arranged parallel or coaxial with the center axis of rotation of the shaft. The second adjustment operator 102 may be arranged transverse to the center axis of the shaft.

The first adjustment drive gear train may comprise a planetary gear train. The planetary gear train may comprises a sun gear 104 operatively connected to a first adjustment operator 100, an internal ring gear 106 fixed to the body 94, and a planet gear 108 rotatably connected to a planet carrier 110. The planet gear 108 may be disposed between the sun gear 104 and the internal planet ring gear 106 and intermeshing therewith. Thus, rotation of the first adjustment operator 100 causes rotation of the sun gear 104, and subsequent rotation of the planet gear 108 around the sun gear and internal planet ring gear 106, and rotation of the planet carrier 110. The first adjustment operator 100 may be coupled to the sun gear 104 with a mechanical fastener 112. The mandrel 80 may have a center formed in its distal end to allow rotation of the mandrel and planet carrier 110 independently of the mechanical fastener. While the drawings show three planet gears 108, more or less may be provided. The planet carrier 110 may be operatively connected with the mandrel 80. The planet carrier 110 may have a bore 111 with a geometry (for instance, square in the drawings) that receives the mandrel 82.

The second adjustment drive gear train may comprise a driven gear 114 mounted to the sleeve 82, and a drive gear 116 intermeshing with the driven gear 114 to cause rotation thereof. The second adjustment operator 102 may be operatively connected to the drive gear 116 to cause rotation thereof. The drive gear 116 and driven gear 114 may comprise a worm gear assembly.

The first adjustment drive 86 may also comprise a lock 120 that prevents rotation of the gear train with the first adjustment operator 100 in the locked position and allows rotation of the gear train with the first adjustment operator in the unlocked position. The lock may comprise a pinion gear 122 intermeshed with an internal ring 124 gear fixed to the body 94. The pinion gear 122 may rotate within the internal ring gear 124. The lock internal ring gear 124 may be coaxial with the planetary gear train and the internal planetary ring gear 106. The lock internal ring gear 124 may be axially spaced from the internal planetary ring gear to the second axial end of the body 94 as shown in the drawings, or may comprise a axial portion of the internal planetary ring gear 106 that is not intermeshed with the planet gears 108. The lock pinion gear 122 may be arranged on a lock gear shaft 126. The lock gear shaft 126 may be rotatable relative to the first adjustment operator 100 in the unlocked position, and the shaft is fixed to the first adjustment operator in the locked position. The lock 120 may include a lock button 128 configured to engage the lock gear shaft 126. The lock button 128 may extend transversely to the lock gear shaft 126. The lock button 128 may have an opening 130 through which the lock gear shaft 126 passes. The lock button 128 may be movable within the first adjustment operator 100 between first and second positions. In the first position, the lock button 128 may be positioned in the first adjustment operator 100 such that the lock button opening 130 is spaced from the lock gear shaft 126, thereby allowing free rotation of the lock gear shaft and thus free rotation of the first adjustment operator and the lock pinion gear 122 around the lock internal ring gear 124. In the second position, the lock button 128 may be positioned such that the lock button opening 130 contacts the lock gear shaft 126, thereby preventing free rotation of the locking gear shaft. A spring (not shown) may urge the lock button 128 to the second position to lock the lock gear shaft 126. Thus, depression of the lock button 128 against spring pressure may be necessary to rotate the first adjustment operator 100. The lock gear shaft 126 may have flats 131 that cooperate with the lock button opening 130 to lock the lock gear shaft. The first adjustment operator may have a dial indicator 132 to assist the user in providing a relative indication of the amount of radial offset when rotating the first adjustment operator and setting the first eccentric surfaces.

The second adjustment drive 92 comprises an operator 102 connected to a shaft 133 which drives the gear train of the second adjustment drive. As shown in the drawings, the gear train of the second adjustment drive comprises a worm gear train operatively connected to the sleeve 82 thereby allowing setting of the second eccentric surface 50. Thus, rotation of the second adjustment operator 102 creates rotation of the worm drive gear 116, the driven gear 114 and the sleeve for setting the second eccentric surface 50. A second spur gear 134 may be provided on the sleeve 82 to drive a dial indicator 136 of the second adjustment operator 102. The dial indicator 136 may provide relative indication of the amount of radial offset when setting the second eccentric surface 50.

FIGS. 29-32 show a second embodiment of an adjustment mechanism 140. The adjustment mechanism includes first and second adjustment drives 142,144. The particulars of the second adjustment drive 144 are not shown in FIGS. 29-32 but they may be similar to the second adjustment drive 92 described earlier, and may include a second adjustment operator 102, worm drive gear 116, and driven gear 114 as shown in FIGS. 23-28. In the embodiment of FIGS. 29-32, for instance, as shown in FIG. 30, the sleeve 82' may have a larger diameter and the sleeve bearing 103 of the embodiment of FIGS. 23-28 may be omitted. The first adjustment drive 142 may include a gear train as previously described including the sun gear 104 which drives planet gears 108 that rotate within the internal planetary ring gear 106. The planet gears 108 may be rotatably connected to the planet carrier 110. The planet carrier 110 may be operatively coupled to the mandrel 80, so rotation of the first adjustment operator 100 causes the sun gear 104 to rotate, the planet gears 108 to rotate, and the planet carrier to effect rotation of the mandrel 80 and the setting of the first eccentric surfaces 46,48.

The first adjustment drive 142 may also comprise a lock 146 that prevents rotation of the gear train with the first adjustment operator 148 in the locked position and allows rotation of the gear train with the first adjustment operator in the unlocked position. The lock 146 may comprise the pinion gear 122 intermeshed with an internal ring 124 gear fixed to the body 94 as described before. The pinion gear 122 may rotate within the lock internal ring gear 124. The lock internal ring gear 124 may be coaxial with the planetary gear train and the internal planetary ring gear 106. The lock internal ring gear 124 may be axially spaced from the internal planetary ring gear to the second axial end of the body 94 as shown in the drawings, or may comprise an axial portion of the internal planetary ring gear 106 that is not intermeshed with the planet gears 108. The lock pinion gear 122 may be arranged on the lock gear shaft 126. The lock gear shaft 126 may be rotatable relative to the first adjustment operator 146 in the unlocked position, and the shaft may be fixed to the first adjustment operator in the locked position.

In the embodiment of FIGS. 29-32, the first adjustment drive 142 includes a second lock gear 150 opposite the lock pinion gear 122 on the lock gear shaft 126. On diametrical lateral sides of the second lock gear 150 gear racks 152,154 may be provided. The second lock gear 150 arranged opposite the pinion gear 122 on the lock gear shaft 126 may be rotatable relative to the first adjustment operator 146 in the unlocked position and fixed to the first adjustment operator in the locked position. The gear racks 152,154 are configured to be moved to intermesh with the second lock gear 150 in the locked position and to un-mesh with the second pinion gear in the unlocked position. A lock button 156 may be provided to position the gear racks 152,154 to intermesh with the second lock gear 150 in the locked position and to un-mesh with the second pinion gear in the unlocked position.

Figure 31:
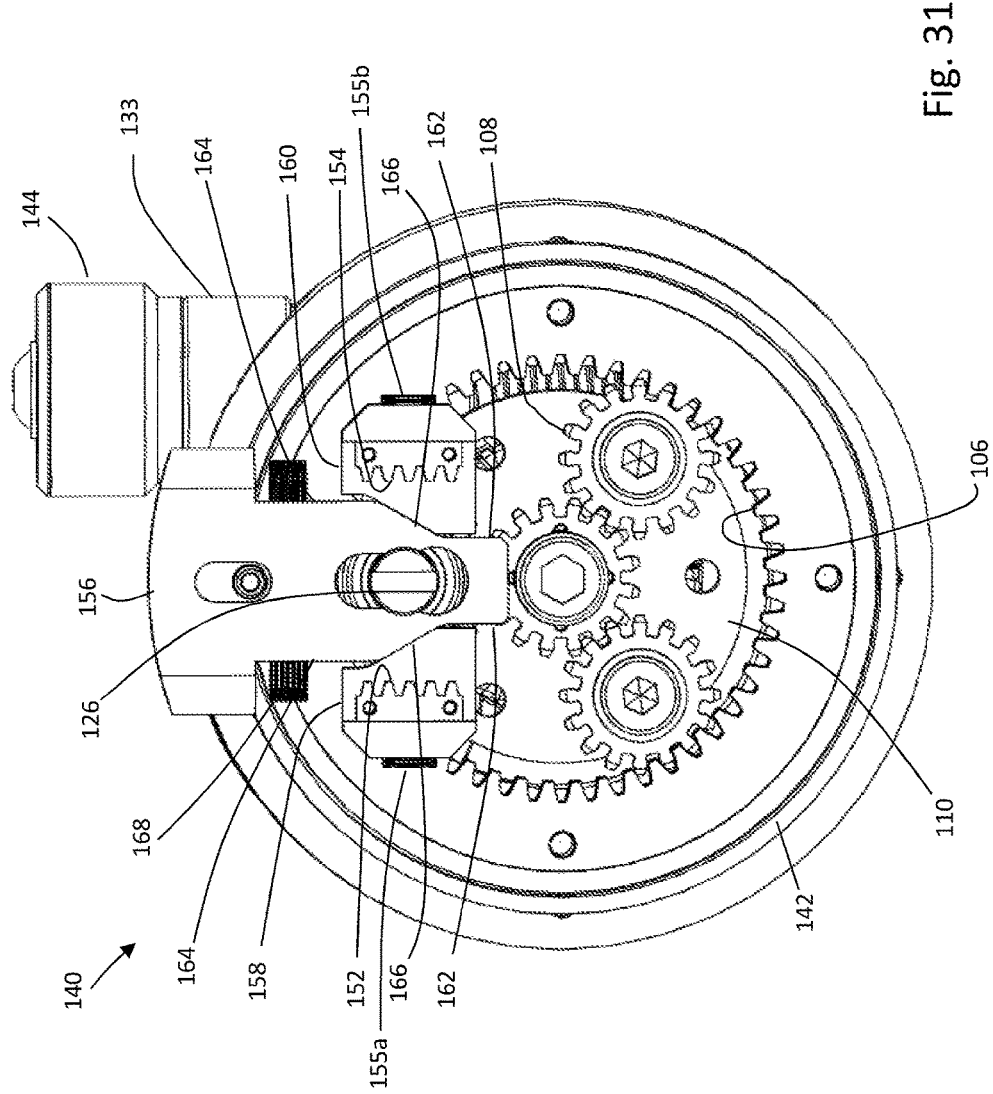
Figure 32:
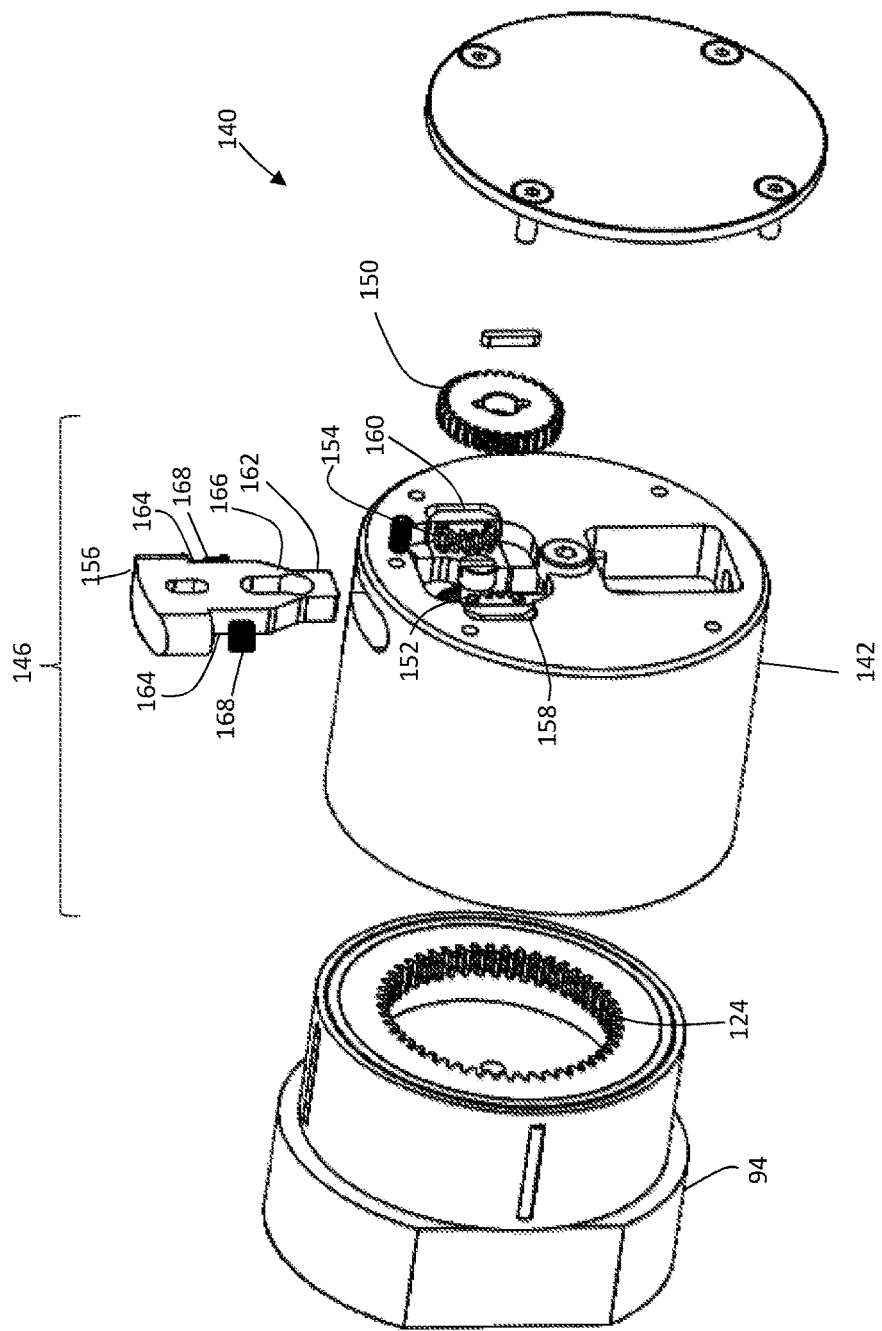

As best shown in FIG. 31 (the lock gear 150 is removed for ease of illustration), the gear racks 152,154 are laterally spaced apart and extend transverse to the center axis of the lock gear shaft. The gear racks 152,154 are biased inward toward each other with a biasing member 155a,155b to engage the second lock gear 150. The gear racks 152,154 may be arranged such that in their inward position relative to the second lock gear, only one gear rack engages the lock gear at any given rotational position. This arrangement allows for double the number of stopping positions of the first adjustment operator and provides fine adjustment. Thus, the adjustment will be twice as fine as if both gear racks engaged the second lock gear 150. The embodiment of the first adjustment drive 142 in FIGS. 29-32 provides incremental stopping positions for setting of the first eccentric surfaces 46,48, whereas the embodiment of the first adjustment drive of FIGS. 17-28 provides an infinitely fine adjustment. The gear racks 152,154 have respective carriers 158, 160 which cooperate with surfaces of the locking button 156. The locking button 156 has a small lateral width portion 162 and a larger lateral width portion 164 with chamfered surfaces 166 therebetween. The locking button 156 is movable within the first adjustment operator 142 between first and second positions. In the first position, the locking button 156 is positioned such that the locking button small lateral width portion 162 is disposed between the gear rack carriers 158,160. Thus, at this inward position, at least one of the gear rack carriers 158,160 is positioned such that its respective gear rack engages the second lock gear 150, thereby preventing free rotation of the first adjustment operator 142. In the second position, the locking button 156 is positioned such that the locking button chamfered surfaces 166 engage the gear rack carriers 158,160 and force the gear racks 152,154 apart, thereby disengaging the second lock gear 150 from at least one of the gear racks and allowing free rotation of the first adjustment operator 142 relative to the body 94. Thus, to allow rotation of the first adjustment operator relative to the body, the lock button 156 is depressed within the first adjustment operator. The lock button 156 may be biased with a biasing member 168 to the locked position.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments.

What is claimed is:

1. An anvil roll comprising:
   a sleeve having first and second axial ends and a hollow interior;
   a bearer adjacent to the sleeve first axial end;
   a shaft extending through the hollow interior of the sleeve having a center axis; and
   a first eccentric disposed between the shaft and the sleeve at the sleeve first axial end, the first eccentric having an extension, the extension being configured such that rotation of the extension sets an amount of radial offset relative to the shaft center axis; and
   a second eccentric disposed between the bearer and the shaft adjacent to the first axial end of the sleeve, the second eccentric having an extension, the extension being configured such that rotation of the extension sets an amount of radial offset relative to the shaft center axis.

2. The anvil roll of claim 1, wherein the first eccentric extension and the second eccentric extension are co-axial.

3. The anvil roll of claim 1, further comprising an inner and outer bearing between the shaft and the bearer.

4. The anvil roll of claim 3, wherein the second eccentric is disposed between the inner and outer bearing.

5. The anvil roll of claim 4, wherein the second eccentric is formed on a carrier between the inner and outer bearing.

6. An anvil roll comprising:
   a sleeve having first and second axial ends and a hollow interior ;
   a shaft having a center axis disposed within the hollow interior of the sleeve;
   a first bearer adjacent to the shaft first axial end;
   a first cylindrical mounting surface arranged adjacent to the first and second axial ends of the sleeve, the first cylindrical mounting surface having a center axis radially offset from the shaft center axis, the shaft being operatively connected with the sleeve at the first cylindrical mounting surface to allow relative rotary motion between the sleeve and the shaft; and
   a second cylindrical mounting surface adjacent to the first axial end of the sleeve, the second cylindrical mounting surface having a center axis radially offset from the shaft center axis, the shaft being operatively connected with the first bearer at the second cylindrical mounting surface to allow relative rotary motion between the first bearer and the shaft body.

7. The anvil roll of claim 6 wherein the shaft has a shaft extension configured such that rotation of the shaft extension rotates the shaft and sets an amount of offset between the first cylindrical mounting surface center axis and the shaft center axis.

8. The anvil roll of claim 6 wherein the first bearer is rotatably mounted to the shaft with an inner and outer bearing.

9. The anvil roll of claim 8 further comprising a carrier disposed between the inner and outer bearings.

10. The anvil roll of claim 9 wherein the second cylindrical surface is formed on the carrier.

11. The anvil roll of claim 10 wherein the carrier has a carrier extension configured such that rotation of the carrier extension rotates the carrier and sets an amount of offset between the second cylindrical mounting surface center axis and the shaft center axis.

12. An anvil roll comprising:
   a sleeve having first and second axial ends and a hollow interior;
   a shaft having a center axis extending between first and second axial ends of the shaft, the shaft being disposed within the hollow interior of the sleeve with the sleeve first axial end adjacent to the shaft first axial end and the sleeve second axial end adjacent to the shaft second axial end;
   a first bearer adjacent to the shaft first axial end and a second bearer adjacent to the shaft second axial end;
   a first cylindrical mounting surface adjacent to first and second axial ends of the shaft, the first cylindrical mounting surface having a center axis radially offset from the shaft center axis, the shaft being operatively connected with the first and second ends of the sleeve at the first cylindrical mounting surface to allow relative rotary motion between the sleeve and the shaft; and
   a second cylindrical mounting surface adjacent to the first axial end of the shaft, the second cylindrical mounting surface having a center axis radially offset from the first cylindrical mounting surface and the shaft center axis, the shaft being operatively connected with the first bearer at the second cylindrical mounting surface to allow relative rotary motion between the first bearer and the shaft; and
   a third cylindrical mounting surface adjacent to the second axial end of the shaft, the third cylindrical mounting surface having a center axis co-axial with the shaft center axis, the shaft being operatively connected with the second bearer at the third cylindrical mounting surface to allow relative rotary motion between the second bearer and the shaft.

13. The anvil roll of claim 12 wherein the first cylindrical mounting surface is formed on the shaft.

14. The anvil roll of claim 13 further comprising a first sleeve bearing mounted at the first cylindrical mounting surface adjacent to the first axial end of the sleeve and a second sleeve bearing mounted at the first cylindrical mounting surface adjacent to the second axial end of the sleeve.

15. The anvil roll of claim 12 wherein the third cylindrical mounting surface is formed on the shaft.

16. The anvil roll of claim 15 wherein the second bearer is rotatably mounted to the shaft with a bearing mounted at the third cylindrical mounting surface.

17. The anvil roll of claim 12 wherein the first bearer is rotatably mounted to the shaft with an inner and outer bearing.

18. The anvil roll of claim 17 further comprising a carrier disposed between the inner and outer bearings.

19. The anvil roll of claim 18 wherein the second cylindrical surface is formed on the carrier.

20. The anvil roll of claim 19 wherein rotation of the carrier sets an amount of radial offset between shaft and the second cylindrical mounting surface.

21. The anvil roll of claim 12 wherein rotation of the shaft sets an amount of radial offset between shaft and the first cylindrical mounting surface.

* * * * *